(12) United States Patent
Ishida

(10) Patent No.: US 10,868,929 B2
(45) Date of Patent: Dec. 15, 2020

(54) INFORMATION PROCESSING APPARATUS, INFORMATION PROCESSING SYSTEM, AND INFORMATION PROCESSING METHOD

(71) Applicant: Takahiro Ishida, Tokyo (JP)

(72) Inventor: Takahiro Ishida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/656,684

(22) Filed: Oct. 18, 2019

(65) Prior Publication Data

US 2020/0177745 A1  Jun. 4, 2020

(30) Foreign Application Priority Data

Nov. 30, 2018 (JP) .................. 2018-225963

(51) Int. Cl.
*H04N 1/00* (2006.01)
*G10L 15/26* (2006.01)
*G10L 15/22* (2006.01)
*G06F 3/12* (2006.01)

(52) U.S. Cl.
CPC ....... *H04N 1/00403* (2013.01); *G06F 3/1204* (2013.01); *G06F 3/1253* (2013.01); *G10L 15/22* (2013.01); *G10L 15/26* (2013.01); *H04N 1/00395* (2013.01); *G10L 2015/223* (2013.01)

(58) Field of Classification Search
CPC ............ H04N 1/00403; H04N 1/00395; G06F 3/1253; G06F 3/1204; G10L 15/26; G10L 15/22; G10L 2015/223
USPC ........................................................ 358/1.15
See application file for complete search history.

(56) References Cited

U.S. PATENT DOCUMENTS

2019/0304453 A1* 10/2019 Nakamura ............... G10L 15/26
2019/0306341 A1* 10/2019 Matysiak ............... G06F 3/1292
2019/0387111 A1* 12/2019 Kobayashi ......... H04N 1/00923

FOREIGN PATENT DOCUMENTS

JP      2007-193138      8/2007

* cited by examiner

*Primary Examiner* — Saeid Ebrahimi Dehkordy
(74) *Attorney, Agent, or Firm* — Oblon, McClelland, Maier & Neustadt, L.L.P.

(57) ABSTRACT

An information processing apparatus includes a memory and circuitry. The memory stores history information including setting information of a previously executed process. The circuitry receives, via a server, a user request input in voice to a terminal. In response to receipt of an instruction from the server to reflect previous settings in job settings, the circuitry reflects settings of a history record of the history information in the memory in the job settings based on the user request. The circuitry further executes a process based on the user request with the job settings reflecting the settings of the history record.

18 Claims, 15 Drawing Sheets

FIG. 8

| | |
|---|---|
| COMMUNICATION MODULE ~111 | INFORMATION INPUT AND OUTPUT MODULE ~116 |
| JOB HISTORY MANAGEMENT MODULE ~112 | JOB SETTING MANAGEMENT MODULE ~117 |
| JOB HISTORY STORAGE MODULE ~113 | JOB EXECUTION MODULE ~118 |
| ADDRESS INFORMATION MANAGEMENT MODULE ~114 | |
| ADDRESS INFORMATION STORAGE MODULE ~115 | |

FIG. 9

| printColor | |
|---|---|
| ☑ Define synonyms   ?   ☐ Allow automated expansion | |
| auto_color | auto_color |
| monochrome | monochrome, black and white |
| color | color, full color |
| two_color | two color |
| single color | single color |
| red_and_black | red and black |

FIG. 10

| Add user expression |
|---|
| Please copy this with settings: two-color, double-sided, and 2 in 1. |
| Please copy document with settings: Tray 1, fitting, and double-sided. |
| Make two copies of this document in dark monochrome. |
| Make three copies with 4 in 1. |
| Execute copy with settings: color and auto tray. |
| Please copy this document at 80% from Tray 1. |
| Copy dark on one side. |
| Copy dark in black and white. |

Action

| copy |
|---|

Entity

| | Entity | ENTITY ⑦ | VALUE |
|---|---|---|---|
| ☐ | copies | @copies | Scopies |
| ☐ | paperTray | @paperTray | SpaperTray |
| ☐ | magnification | @magnification | Smagnification |
| ☐ | printColor | @printColor | SprintColor |
| ☐ | printSide | @printSide | SprintSide |
| ☐ | combine | @combine | Scombine |
| ☐ | density | @density | Sdensity |
| | ⋮ | ⋮ | ⋮ |

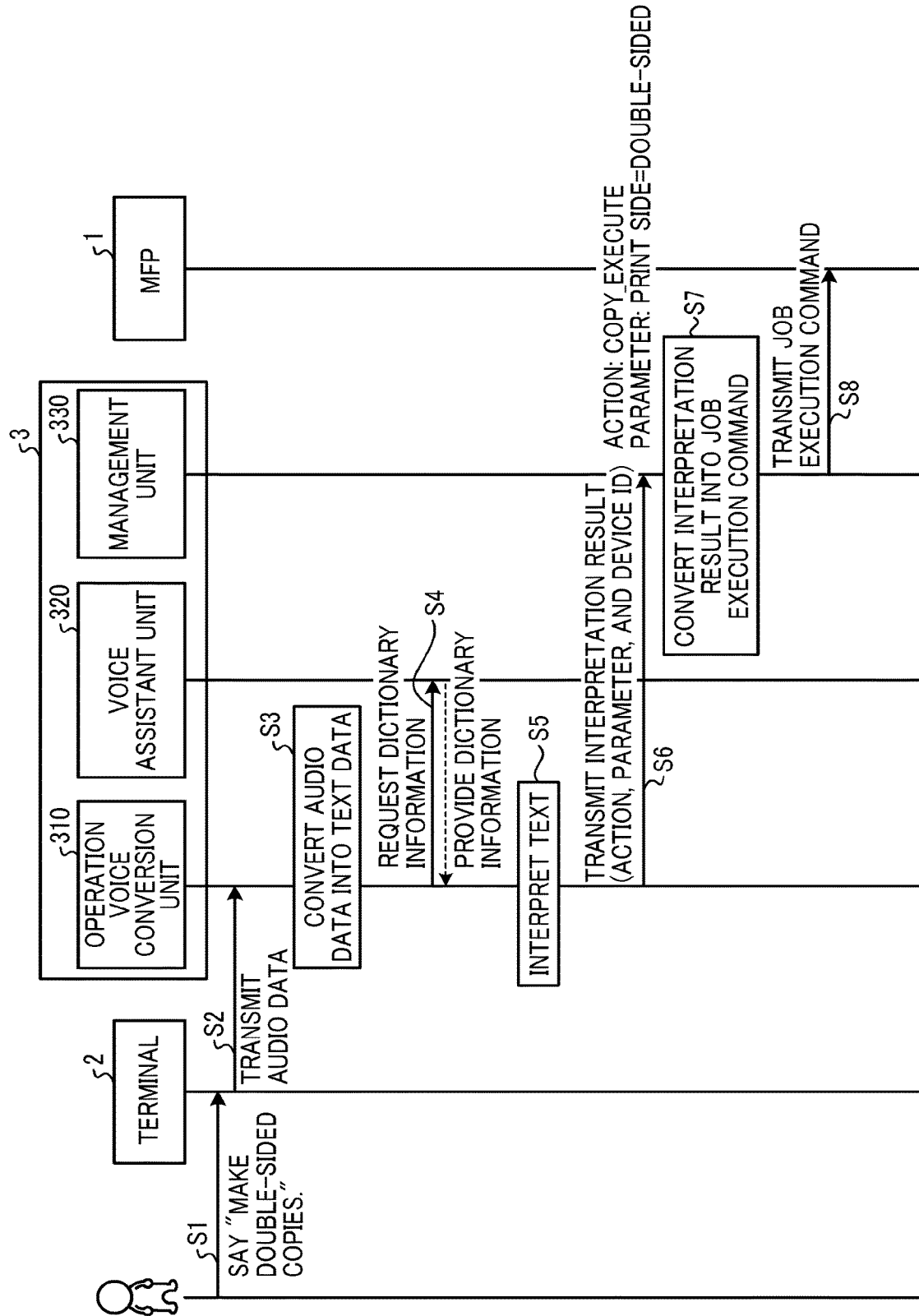

INFORMATION PROCESSING APPARATUS, INFORMATION PROCESSING SYSTEM, AND INFORMATION PROCESSING METHOD

CROSS-REFERENCE TO RELATED APPLICATION

This patent application is based on and claims priority pursuant to 35 U.S.C. § 119(a) to Japanese Patent Application No. 2018-225963 filed on Nov. 30, 2018 in the Japan Patent Office, the entire disclosure of which is hereby incorporated by reference herein.

BACKGROUND

Technical Field

The present invention relates to an information processing apparatus, an information processing system, and an information processing method.

Description of the Related Art

There is a technique of transmitting an operation instruction from a mobile terminal to a server and transmitting an operation signal from the server to an apparatus to operate the apparatus.

For example, there is a technique of transmitting audio data acquired by a mobile terminal to a server, converting the audio data into a control command with the server, and transmitting the control command to an apparatus.

SUMMARY

In one embodiment of this invention, there is provided an improved information processing apparatus that includes, for example, a memory and circuitry. The memory stores history information including setting information of a previously executed process. The circuitry receives, via a server, a user request input in voice to a terminal. In response to receipt of an instruction from the server to reflect previous settings in job settings, the circuitry reflects settings of a history record of the history information in the memory in the job settings based on the user request. The circuitry further executes a process based on the user request with the job settings reflecting the settings of the history record.

In one embodiment of this invention, there is provided an improved information processing system that includes, for example, a server and an information processing apparatus connectable with the server via a communication network. The server includes first circuitry that acquires audio information of voice input via a terminal. Based on the acquired audio information, the first circuitry instructs the information processing apparatus to execute settings based on a user request. The information processing apparatus includes a memory and second circuitry. The memory stores history information including setting information of a previously executed process. When the user request includes information specifying previous settings, the second circuitry reflects settings of a history record of the history information in job settings based on the user request. The second circuitry further executes a process based on the user request with the job settings reflecting the settings of the history record.

In one embodiment of this invention, there is provided an improved information processing method that includes, for example: storing, in a memory, history information including setting information of a previously executed process; acquiring a user request input in voice to a terminal; when the user request includes an instruction to reflect previous settings in job settings, reflecting settings of a history record of the history information in the job settings based on the user request; and executing a process based on the user request with the job settings reflecting the settings of the history record.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a diagram illustrating a configuration example of functional blocks of the MFP of the embodiment;

FIG. 9 is a diagram illustrating an example of entity information of the embodiment;

FIG. 10 is a diagram illustrating examples of user utterance phrases, action name, and entity information of the embodiment;

FIG. 11 is a sequence diagram illustrating an example of a basic overall procedure of a voice input operation performed in the voice operation system of the embodiment;

Figure 1:
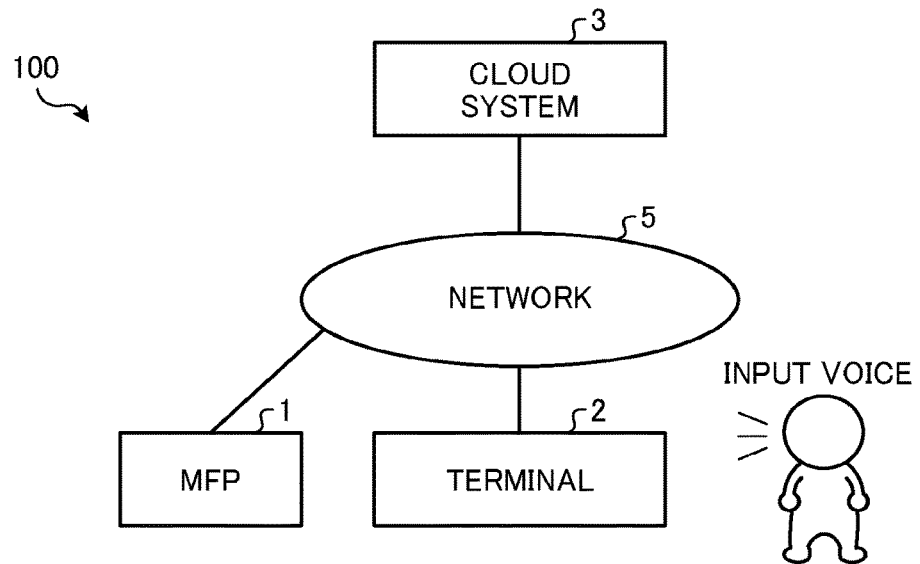
FIG. 1 is a diagram illustrating an example of general arrangement of a voice operation system of an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of an information processing apparatus, an information processing system, and an information processing method of the present invention will be described below with reference to the accompanying drawings. The following description will be given of an example of application to an information processing system that enables the operation of an information processing apparatus such as an image processing apparatus via a terminal such as a smart speaker with a service provided by a cloud system.

A system configuration of an information processing system of an embodiment of the present invention will be described.

FIG. 1 is a diagram illustrating an example of general arrangement of the information processing system of the embodiment. FIG. 1 illustrates general arrangement of a voice operation system 100 as an example of the information processing system of the embodiment.

As illustrated in FIG. 1, the voice operation system 100 of the present example includes at least one multifunction peripheral (MFP) 1 (an example of second circuitry), at least one terminal 2, and a cloud system 3 (an example of first circuitry). The MFP 1 is an example of an information processing apparatus. The MFP 1 has a plurality of functions, such as a printer function, a scanner function, and a facsimile (FAX) function, for example. The information processing apparatus may be another apparatus other than the MFP. For example, the information processing apparatus may be an apparatus with one of the plurality of functions such as the printer function, the scanner function, and the FAX function. That is, the information processing apparatus may be a printer, a scanner, or a FAX terminal, for example. Further, the information processing apparatus may be office equipment, such as an electronic whiteboard or a projector, or may be a different type of electronic apparatus. The terminal 2 is a device capable of transmitting an operation instruction to the MFP 1 via a network 5, such as a smart speaker, a smartphone, or a tablet terminal. The following description will be given on the assumption that the terminal 2 of the present example is a smart speaker.

A smart speaker receives voice input from a service user (hereinafter simply referred to as the user) requesting an operation of the MFP 1, and outputs audio feedback to the user as a response to the received operation. The smart speaker may include a touch display panel. In this case, a message to the user may be displayed on the touch display panel. In the present example described below, a smart speaker with a touch display panel is used as the terminal 2.

The at least one MFP 1 and the at least one terminal 2 are configured to be connectable to the network 5 to be connected to the cloud system 3 via the network 5. In the present example, in which the terminal 2 is a smart speaker, one smart speaker is placed near one MFP 1 to operate the MFP 1.

The cloud system 3 is implemented by one or more servers (i.e., cloud service apparatuses 3a in FIG. 4) residing on the network 5. Via the network 5, the cloud system 3 provides a service enabling the user to operate the MFP 1 via the terminal 2 (hereinafter referred to as the cloud service).

The network 5 is a communication network, such as a local area network (LAN) or the Internet, for example. Each of the MFP 1 and the terminal 2 includes a communication device. With the communication device, the MFP 1 and the terminal 2 are connected by wire or wirelessly to a network, such as an in-house LAN or a public network, to access the cloud system 3 via the Internet, for example.

As described in detail later, the terminal 2 performs data communication with the cloud system 3 (e.g., transmission and reception of audio data, text data, or image data for a user interface (UI)). The cloud system 3 analyzes the audio data (i.e., audio information) received from the terminal 2, and converts the audio data into text data. The cloud system 3 further interprets the intention of the user based on the text data and previously registered dictionary information. Further, when the instruction from the user is confirmed, for example, the cloud system 3 converts the user instruction into a job execution command (i.e., user request) in a format compatible with the MFP 1, and transmits the job execution command to the MFP 1. The MFP 1 executes the job execution command transmitted from the cloud system 3.

A hardware configuration of the MFP 1 will be described.

Figure 2:
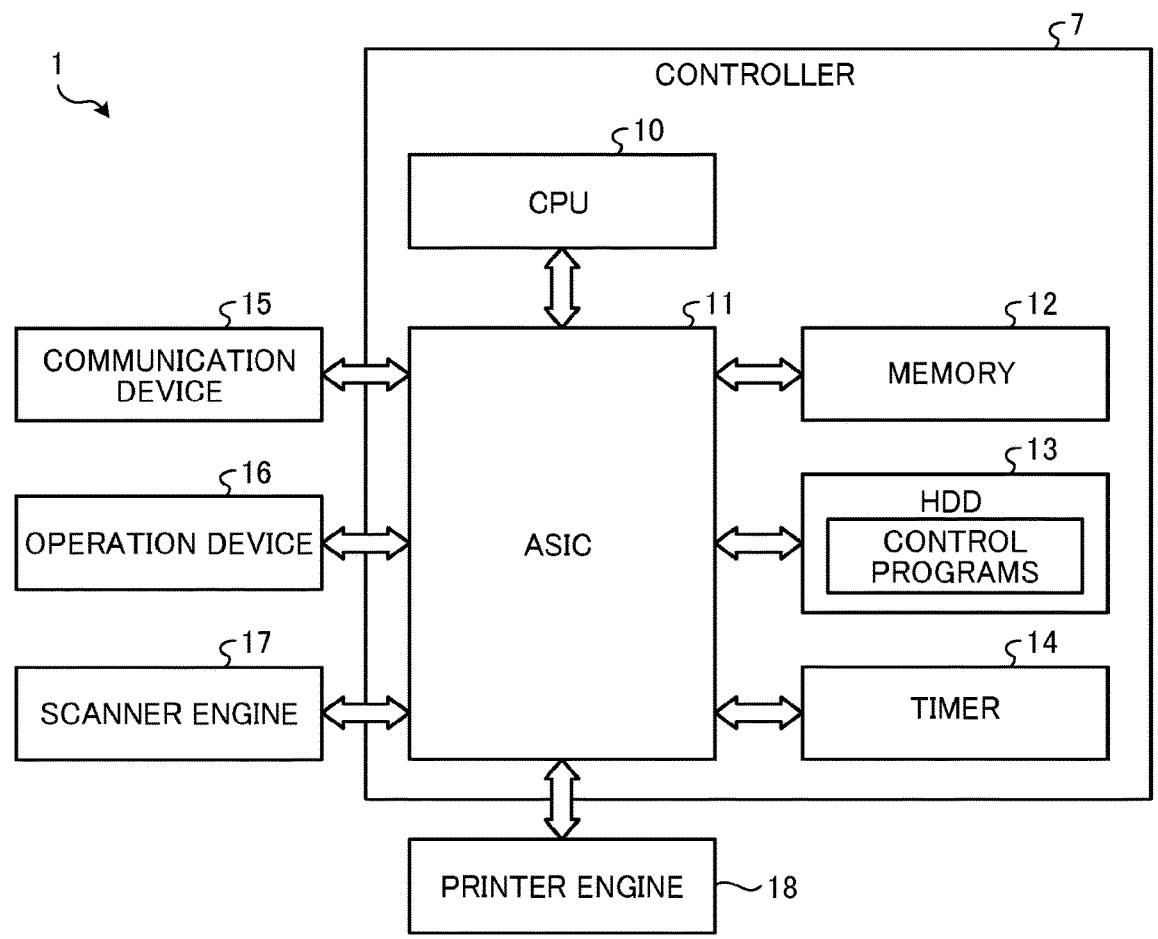
FIG. 2 is a diagram illustrating an example of the hardware configuration of a multifunction peripheral (MFP) forming the voice operation system of the embodiment.

FIG. 2 is a diagram illustrating an example of the hardware configuration of the MFP 1. As illustrated in FIG. 2, the MFP 1 includes a controller 7, a communication device 15, an operation device 16, a scanner engine 17, and a printer engine 18. The MFP 1 further includes an alarm device that communicates a message to the user with sound or light, for example. The alarm device may be included in the operation device 16.

The controller 7 includes a central processing unit (CPU) 10, an application specific integrated circuit (ASIC) 11, a memory 12, a hard disk drive (HDD) 13, and a timer 14, which are communicably connected to each other via a bus line.

The communication device 15 is connected to the network 5 to communicate with the cloud system 3. The communication device 15 transmits apparatus information of the MFP 1 to the cloud system 3, and acquires an instruction from the cloud system 3 as the job execution command. The instruction is a scan instruction or a print instruction, for example, input in voice via the terminal 2.

The operation device 16 is implemented as a touch panel integrating a liquid crystal display (LCD) and a touch sensor. When specifying settings or issuing a job execution command, the user touches and operates a software key of the operation device 16 (i.e., an operation button displayed on the operation device 16). In the present embodiment, the operation of the MFP 1 such as the setting of the MFP 1 is performed based on voice input to the terminal 2. However, it is also possible to instruct the controller 7 to execute settings or an operation through normal (i.e., manual) operation of the operation device 16. Particularly when performing a printing or scanning operation with the MFP 1, a final execution operation after various settings is desired to be performed with an operation button of the operation device 16 of the MFP 1.

The scanner engine 17 is a controller that controls an image reading device to optically read a document. The printer engine 18 is a controller that controls an image forming device to print an image on a transfer sheet, for example. The CPU 10 performs overall control of the MFP 1. The ASIC 11 is implemented as a large-scale integration (LSI) circuit that performs various image processing for images to be processed by the scanner engine 17 and the printer engine 18. The CPU 10 selectively executes various applications, such as a scanner application and a printer application, to thereby cause various engines to execute the job execution command with the respective applications.

The memory 12 stores fixed data. The HDD 13 stores control programs and data, which include an operating system (OS), various applications, image data for use in the execution of the applications, font data, and various files. The controller 7 may include a solid state drive (SSD) in place of or in addition to the HDD 13.

A hardware configuration of the terminal 2 will be described.

Figure 3:
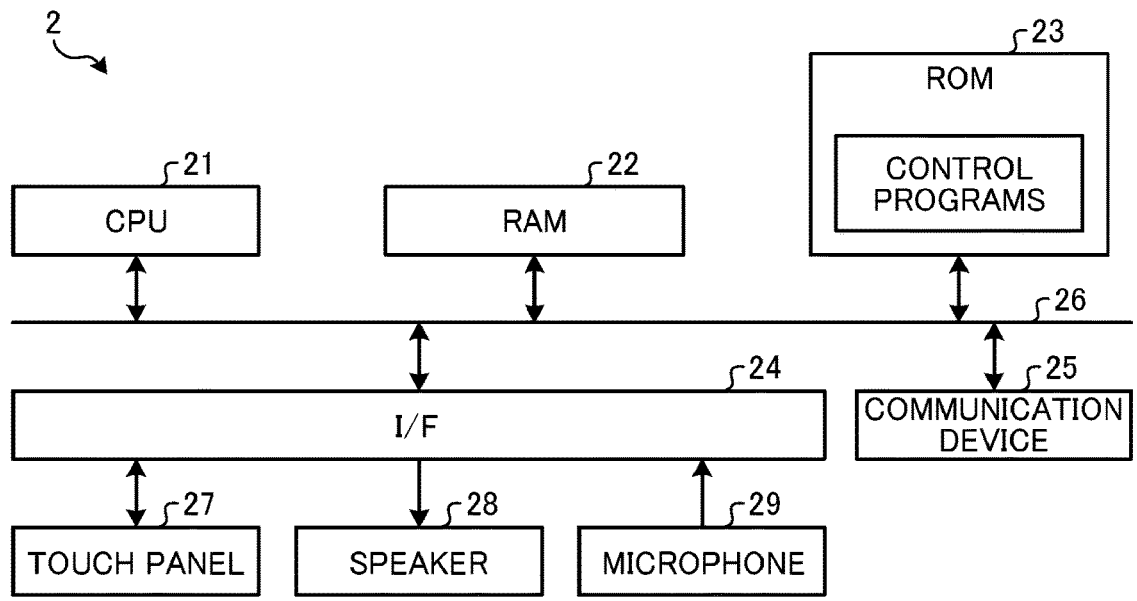
FIG. 3 is a diagram illustrating an example of the hardware configuration of a terminal forming the voice operation system of the embodiment.

FIG. 3 is a diagram illustrating an example of the hardware configuration of the terminal 2. As illustrated in FIG. 3, the terminal 2 includes a CPU 21, a random access memory (RAM) 22, a read only memory (ROM) 23, an interface (I/F) 24, and a communication device 25, which are connected to each other via a bus line 26.

The ROM 23 stores control programs. The control programs include an operation processing program. The CPU 21 executes the control programs stored in the ROM 23. The RAM 22 is used as a work area of the CPU 21.

The I/F 24 is connected to a touch panel 27, a speaker 28, and a microphone 29. The microphone 29 collects voices of telephone call conversations and user utterances, for example, and inputs the voices as audio signals. The speaker 28 outputs sound as a response to the user, for example. The touch panel 27 receives an operation performed thereon by the user, and displays data, such as text data or image data, to the user.

The thus-configured terminal 2 transmits the audio signals input via the microphone 29 to the cloud system 3 via the communication device 25. The terminal 2 further performs control such as causing the touch panel 27 to display the data (e.g., audio data, text data, or image data) acquired from the cloud system 3 via the communication device 25 and causing the speaker 28 to output the audio data as sound.

A hardware configuration of the cloud system 3 will be described.

Figure 4:
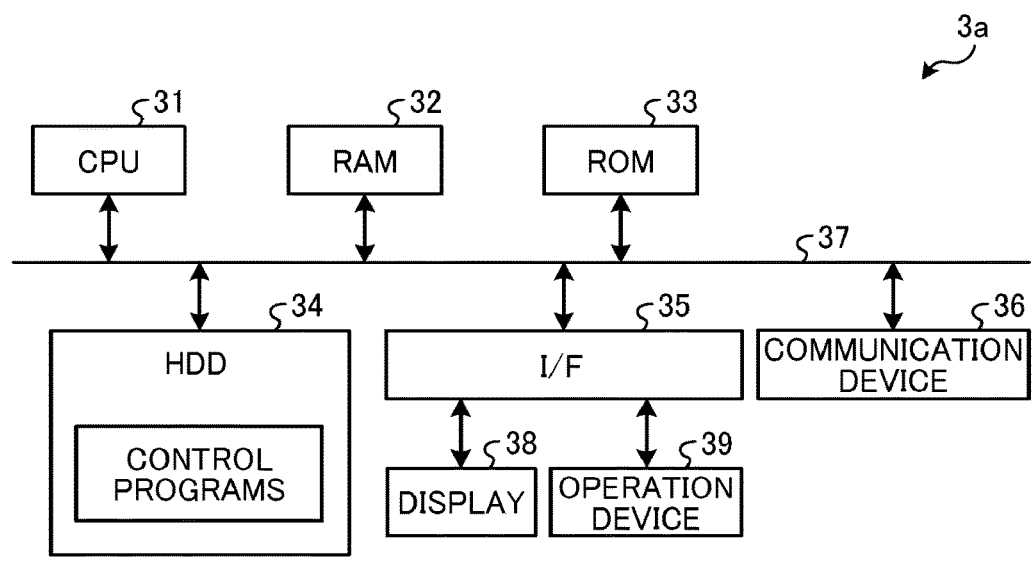
FIG. 4 is a diagram illustrating an example of the hardware configuration of a cloud service apparatus forming the voice operation system of the embodiment.

The cloud system 3 provides the cloud service with one server or a plurality of servers cooperating with each other. FIG. 4 is a diagram illustrating an example of the hardware configuration of such a server (hereinafter referred to as the cloud service apparatus 3a).

As illustrated in FIG. 4, the cloud service apparatus 3a includes a CPU 31, a RAM 32, a ROM 33, an HDD 34, an I/F 35, and a communication device 36, which are connected to each other via a bus line 37. The I/F 35 is connected to a display 38 and an operation device 39. The HDD 34 stores control programs and databases. The control programs include an operation voice conversion program, a voice assistant program, and a management program, for example.

Figure 5:
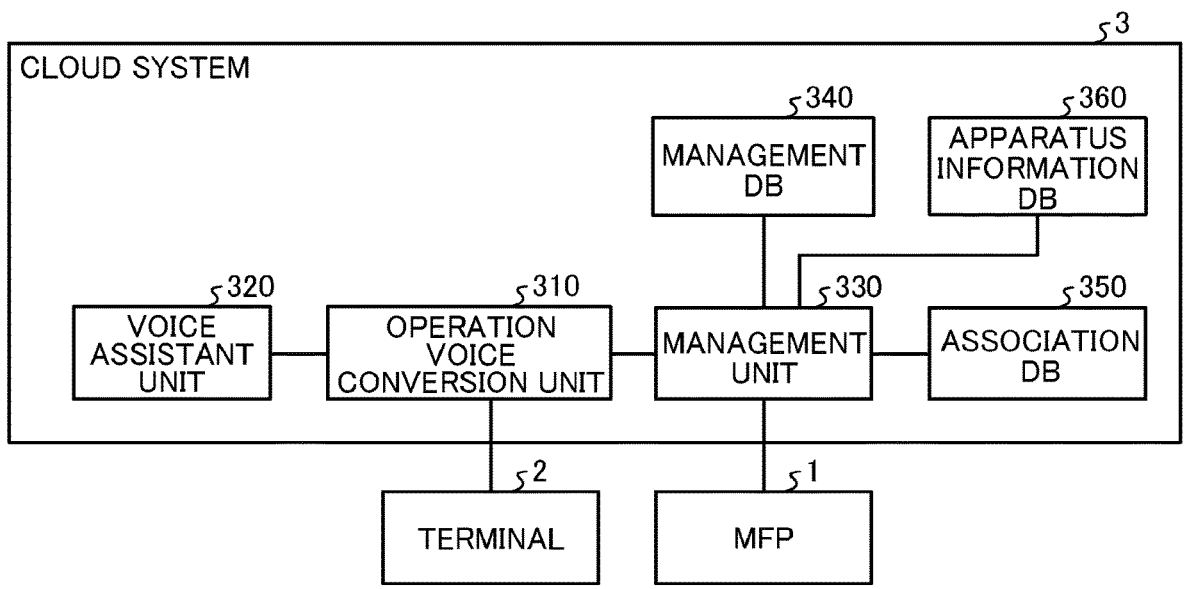
FIG. 5 is a diagram illustrating overall functions of a cloud system forming the voice operation system of the embodiment.

The databases include a management database (DB) 340, an association DB 350, and an apparatus information DB 360, for example, as illustrated in FIG. 5.

The ROM 33 stores fixed programs. The CPU 31 executes programs stored in the ROM 33 and the HDD 34. The RAM 32 is used as a work area of the CPU 31.

The operation voice conversion program, the voice assistant program, and the management program may be stored in and executed by one cloud service apparatus 3a. Alternatively, part of these programs may be dispersedly stored in and executed by a plurality of cloud service apparatuses 3a such that the plurality of cloud service apparatuses 3a cooperate with each other to provide the cloud service.

Further, the management DB 340, the association DB 350, and the apparatus information DB 360 may be stored in one cloud service apparatus 3a together with the operation voice conversion program, the voice assistant program, and the management program. Alternatively, these databases may be dispersedly stored in a plurality of cloud service apparatuses 3a. For example, one or all of the management DB 340, the association DB 350, and the apparatus information DB 360 may be stored in another server accessible via the network 5.

An overall functional configuration of the cloud system 3 will be described.

FIG. 5 is a diagram illustrating an overview of overall functions of the cloud system 3. FIG. 5 illustrates major functions of the cloud system 3 for providing the cloud service. Details of these major functions of the cloud system 3 and functions of the MFP 1 and the terminal 2 illustrated in FIG. 5 will be described later with reference to FIGS. 6 to 8.

The functions of the cloud system 3 are implemented by one or more cloud service apparatuses 3a, and are appropriately set in the one or more cloud service apparatuses 3a.

The CPU 31 of the cloud service apparatus 3a reads the operation voice conversion program stored in the HDD 34, and deploys and executes the operation voice conversion program in the RAM 32, to thereby function as an operation voice conversion unit 310. The operation voice conversion unit 310 has a function of converting audio data into text data. The operation voice conversion unit 310 further has a function of determining whether the text data matches previously defined dictionary information, and if the text data matches the dictionary information, converting the text data into an action representing the intention of the user and parameters representing variables of job conditions, for example.

The CPU 31 of the cloud service apparatus 3a further reads the voice assistant program stored in the HDD 34, and deploys and executes the voice assistant program in the RAM 32, to thereby function as a voice assistant unit 320. The voice assistant unit 320 has a function of holding the dictionary information.

The CPU 31 of the cloud service apparatus 3a further reads the management program stored in the HDD 34, and deploys and executes the management program in the RAM 32, to thereby function as a management unit 330. The management unit 330 has a function of converting the text data into a job execution command in a format compatible with the registered MFP 1 based on the action and the parameters, and transmitting the job execution command to the MFP 1.

The cloud system 3 thus provides the cloud service with at least the functions of the operation voice conversion unit 310, the voice assistant unit 320, and the management unit 330.

The cloud system 3 stores a variety of information in databases based on communication with the MFP 1 and the terminal 2. For example, the management unit 330 manages the variety of information by using the management DB 340, the association DB 350, and the apparatus information DB 360.

The management DB 340 is a database that stores data (e.g., text data, image data, or audio data) of content provided by the cloud system 3.

The association DB 350 is a database that stores information of an information processing apparatus (i.e., an external apparatus) to be associated with the terminal 2. In the present example, in which the terminal 2 and the MFP 1 associated therewith are the smart speaker and the information processing apparatus, respectively, the association DB 350 stores a device identification (ID) of the smart speaker and an apparatus ID of the information processing apparatus in association with each other. The smart speaker and the information processing apparatus may be associated with each other on a one-to-one basis. Alternatively, the smart speaker may be associated with a plurality of information processing apparatuses. That is, the type and number of information processing apparatuses associated with one device ID are not limited. Further, the method of associating the information processing apparatus with the smart speaker is not limited to the above-describe method. That is, the information processing apparatus may be associated with user identifying information such as a user account or a user ID. In this case, information identifying the smart speaker (e.g., the device ID), which is transmitted to the cloud system 3 from the smart speaker, and the user identifying information may be stored in the association DB 350 of the cloud system 3, for example, and the management unit 330 may identify the information processing apparatus based on the user identifying information associated with the device ID. Alternatively, the smart speaker may transmit to the cloud system 3 the user identifying information in place of the device ID. Further, the information of the information processing apparatus may be associated with information identifying an organization, such as a company or a department therein, or information identifying a place, such as a building or a room, in place of the user identifying information. In this case, one or more smart speakers and one or more information processing apparatuses may be associated with each other.

The apparatus information DB 360 is a database that stores the apparatus ID of each information processing apparatus such as the MFP 1 and the apparatus information of the information processing apparatus in association with each other.

Functions of the terminal 2 will be described.

Figure 6:
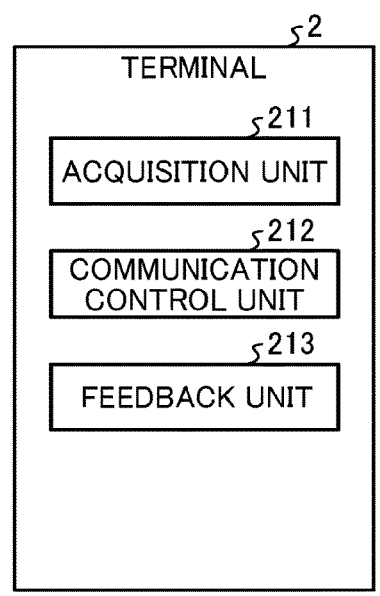
FIG. 6 is a diagram illustrating a configuration example of functional blocks of the terminal of the embodiment.

FIG. 6 is a diagram illustrating a configuration example of functional blocks of the terminal 2. The CPU 21 of the terminal 2 executes the operation processing program stored in the ROM 23, to thereby function as an acquisition unit 211, a communication control unit 212, and a feedback unit 213, as illustrated in FIG. 6.

The acquisition unit 211 acquires the voice of the user collected via the microphone 29 in FIG. 3, i.e., the instruction voice of the user for the voice operation of the MFP 1. Alternatively, the acquisition unit 211 may acquire data of the user operation via the touch panel 27 in FIG. 3 or a physical switch, for example. The communication control unit 212 controls communication with the cloud system 3. The communication control unit 212 communicates with the cloud system 3 to transmit the information acquired by the acquisition unit 211 to the cloud system 3 or acquire text data, image data, or audio data from the cloud system 3. When transmitting the information acquired by the acquisition unit 211 to the cloud system 3, the communication control unit 212 may transmit the device ID of the terminal 2 to the cloud system 3 together with the acquired information.

The feedback unit 213 outputs audio feedback to the user to prompt the user to input missing data or confirm the input, for example, to implement an interactive voice input operation. The feedback unit 213 may also control display of the touch panel 27 to output feedback to the user as text or an image.

In the present example, the acquisition unit 211, the communication control unit 212, and the feedback unit 213 are implemented by software. Alternatively, part or all of these units may be implemented by hardware such as an integrated circuit (IC). Further, the functions of these units may be implemented by the operation processing program alone. Alternatively, a part of the processing of these units may be executed by another program, or may be indirectly executed with another program.

Details of functions of the cloud system 3 for providing the cloud service will be described.

Figure 7:
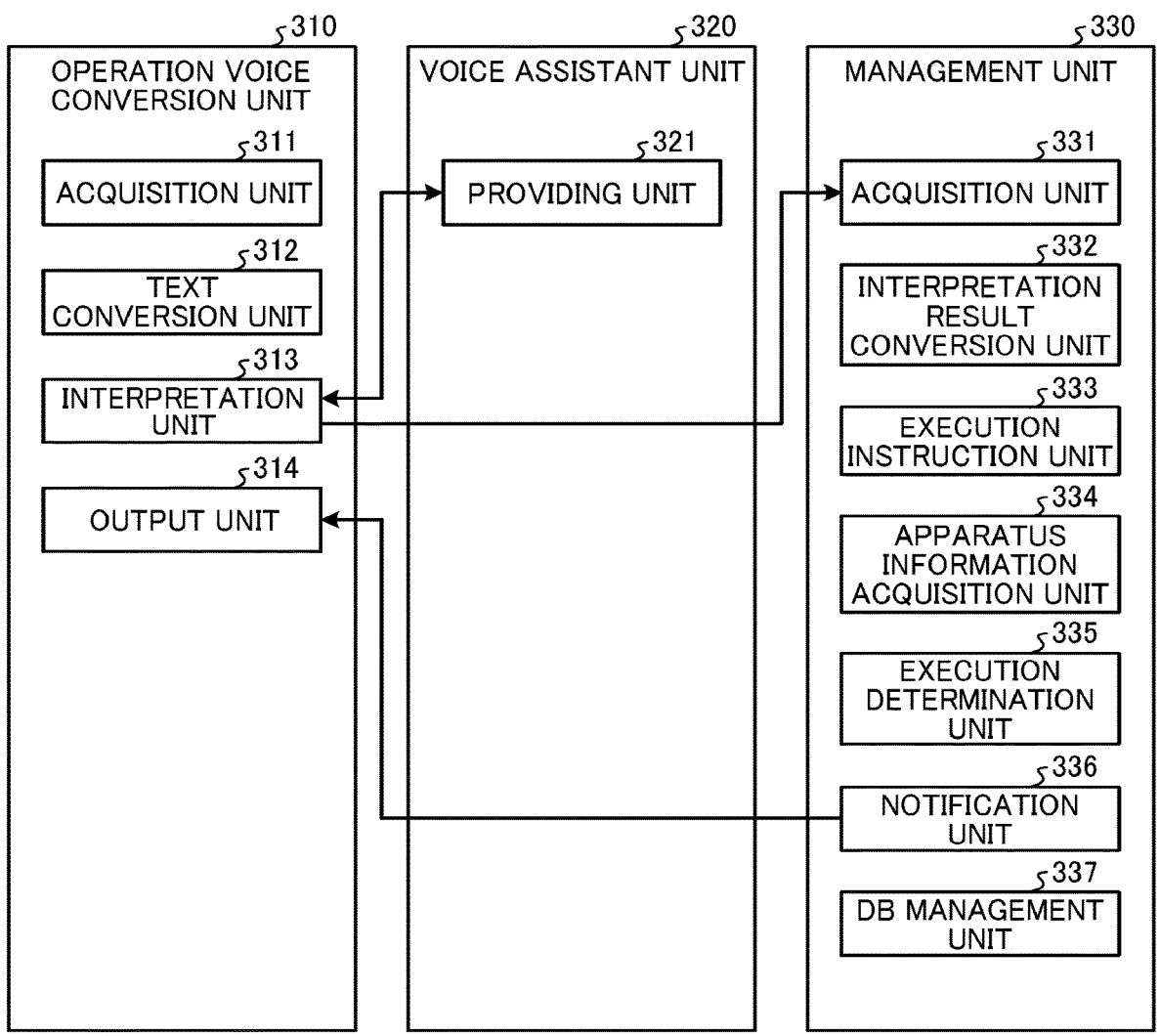
FIG. 7 is a diagram illustrating a configuration example of functions of the cloud system of the embodiment for proving a cloud service.

FIG. 7 is a diagram illustrating a configuration example of functions of the cloud system 3 for providing the cloud service. As illustrated in FIG. 7, the operation voice conversion unit 310 includes functions such as an acquisition unit 311, a text conversion unit 312, an interpretation unit 313, and an output unit 314.

The acquisition unit 311 acquires the audio data transmitted from the terminal 2 (i.e., the audio data of the input voice of the user). The acquisition unit 311 may also acquire data representing an operation performed by the user on the touch panel 27 or a physical switch (e.g., a button) of the terminal 2. The text conversion unit 312 includes a speech-to-text (STT) function that converts audio data (i.e., the audio data of the voice of the user input to the terminal 2) into text data. The interpretation unit 313 interprets the contents of the user instruction based on the text data converted by the text conversion unit 312. Specifically, the interpretation unit 313 determines whether a word or phrase included in the text data converted by the text conversion unit 312 matches the dictionary information provided by the voice assistant unit 320. Then, if the word or phrase in the text data matches the dictionary information, the interpretation unit 313 converts the text data into the action representing the type of job and the parameters representing the variables of the job conditions, for example. The interpretation unit 313 then transmits the action and the parameters to the management unit 330 together with the device ID identifying the terminal 2 as the source of the acquired audio data, for example. The output unit 314 includes a text-to-speech (TTS) function that generates audio data from text data. The output unit 314 controls the communication of the communication device 36 in FIG. 4 to transmit data (e.g., text data, audio data, or image data) to the terminal 2.

In the present example, the acquisition unit 311, the text conversion unit 312, the interpretation unit 313, and the output unit 314 are implemented by software. Alternatively, part or all of these units may be implemented by hardware such as an IC. Further, the functions of these units may be implemented by the operation voice conversion program alone. Alternatively, a part of the processing of these units may be executed by another program, or may be indirectly executed with another program. Further, the functions of the interpretation unit 313 implemented by the operation voice conversion program may be partially or entirely executed by the voice assistant program. In this case, the voice assistant unit 320 determines whether a word or phrase included in the text data matches the dictionary information, for example. Further, if the word or phrase in the text data matches the dictionary information, the voice assistant unit 320 converts the text data into the action representing the intention of the user and the parameters representing the variables of the job conditions, for example. In this case, therefore, the interpretation unit 313 simply acquires the action and the parameters from the voice assistant unit 320.

As illustrated in FIG. 7, the voice assistant unit 320 has the function of a providing unit 321. The providing unit 321 manages the dictionary information, which previously defines the relationship between the text data, the action, and the parameters. The providing unit 321 provides the dictionary information to the operation voice conversion unit 310. The voice assistant unit 320 may receive the text data from the operation voice conversion unit 310 and interpret the operation instruction from the user based on the text data. For example, the voice assistant unit 320 may acquire the text data from the interpretation unit 313 and determine whether a word or phrase included in the text data matches the dictionary information. Then, if the word or phrase in the text data matches the dictionary information, the voice assistant unit 320 may convert the text data into an action and parameters and provide the action and the parameters to the interpretation unit 313.

In the present example, the voice assistant unit 320 including the providing unit 321 is implemented by software. Alternatively, part or all of the voice assistant unit 320 may be implemented by hardware such as an IC. Further, functions such as the providing unit 321, for example, may be implemented by the voice assistant program alone. Alternatively, a part of the processing of the functions may be executed by another program, or may be indirectly executed with another program.

As illustrated in FIG. 7, the management unit 330 includes functions such as an acquisition unit 331, an interpretation result conversion unit 332, an execution instruction unit 333, an apparatus information acquisition unit 334, an execution determination unit 335, a notification unit 336, and a DB management unit 337.

The acquisition unit 331 acquires the interpretation result from the interpretation unit 313.

The interpretation result conversion unit 332 converts the interpretation result (e.g., action and parameters) converted by the operation voice conversion unit 310 into a job execution command compatible with the MFP 1.

The execution instruction unit 333 transmits the job execution command to the MFP 1 to instruct the MFP 1 to execute the job. Specifically, the execution instruction unit 333 acquires the job execution command from the interpretation result conversion unit 332. The execution instruction unit 333 may acquire, as well as the action and the parameters, the device ID of the terminal 2 having received the voice instruction from the user. The execution instruction unit 333 searches through the association DB 350 in FIG. 5 for the MFP 1 corresponding to the acquired device ID, and transmits the job execution command to the MFP 1 retrieved by the search.

The apparatus information acquisition unit 334 acquires the apparatus information from each registered information processing apparatus (i.e., the MFP 1 in the present example). For example, the apparatus information acquisition unit 334 acquires information representing the processing capability of the MFP 1, such as the maximum processable pixel number of the MFP 1. The apparatus information acquisition unit 334 further acquires, as appropriate, information of the apparatus state from the MFP 1 in accordance with the settings. The information of the apparatus state includes information representing the connection state indicating whether communication connection with the MFP 1 is established, the power state of the MFP 1 such as the power-on state, the power-off state, or the sleep-mode state, the occurrence or non-occurrence of an error and the type of the error, the remaining amounts of consumables such as paper and toner, and the login state of the user, and authorization information representing functions authorized to be used by the logged-in user.

If the apparatus information such as the processing capability is acquired from a plurality of MFPs 1, the apparatus information acquisition unit 334 manages, in the apparatus information DB 360 in FIG. 5, the apparatus information of each of the MFPs 1 in association with information identifying the MFP 1 such as the apparatus ID of the MFP 1.

The execution determination unit 335 compares the processing capability of the MFP 1 with the user-specified job (i.e., the action and parameters generated by the operation voice conversion unit 310), to thereby determine whether the user-specified job is executable in the MFP 1. If it is determined that the user-specified job is executable in the MFP 1, the execution determination unit 335 transmits the job execution command to the MFP 1. If it is determined that the user-specified job is inexecutable in the MFP 1, the execution determination unit 335 may cause the notification unit 336 to feed back an error message, for example, to the terminal 2 via the operation voice conversion unit 310 as response information.

The notification unit 336 transmits data (e.g., text data, audio data, or image data) to the operation voice conversion unit 310 as a response to the job execution instruction from the user. If any of the parameters representing the job conditions for executing the job is unspecified, the notification unit 336 transmits feedback to the terminal 2 via the operation voice conversion unit 310, to thereby prompt the user to specify the unspecified parameter. In this case, the notification unit 336 may transmit parameter information as information for checking with the user about the unspecified parameter. Further, the notification unit 336 may transmit text data, audio data, or image data as information for prompting the user to specify the unspecified parameter.

The DB management unit 337 manages the management DB 340, the association DB 350, and the apparatus information DB 360. Specifically, the DB management unit 337 executes setting of various tables and registration, retrieval, deletion, and updating of data in the various tables, for example. For instance, based on information and an instruction input to the MFP 1, the terminal 2, or a client device of the cloud service apparatus 3a, the DB management unit 337 registers the device ID of the terminal 2 and the apparatus ID of the MFP 1 in association with each other in the association DB 350. The association DB 350 holds information associating the device ID of the terminal 2 with the apparatus ID of the MFP 1 in table data format, for example.

Functions of the MFP 1 will be described.

FIG. 8 is a diagram illustrating a configuration example of functional blocks of the MFP 1. The CPU 10 of the MFP 1 executes various programs stored in the memory 12 and the HDD 13, to thereby implement functions such as a communication module 111, a job history management module 112, a job history storage module 113, an address information management module 114, an address information storage module 115, an information input and output module 116, a job setting management module 117, and a job execution module 118.

The communication module 111 communicates with the cloud system 3. The job history management module 112 manages job history. The job history storage module 113 stores the job history. The address information management module 114 manages address information such as an electronic mail address or a FAX number. The address information storage module 115 stores the address information. The information input and output module 116 displays setting information and receives selection of settings selected from the setting information by the user. The job setting management module 117 manages job settings. The job execution module 118 executes the job.

For example, the communication module 111 is a hub module that communicates with the cloud system 3 via the communication device 15. The communication module 111 collects information of the apparatus state and the settings of the MFP 1, and transmits information of the functions and the state of the MFP 1 to the cloud system 3. The communication module 111 transmits the information of the apparatus state to the cloud system 3 periodically or when the apparatus state changes. The communication module 111 further receives the job execution command from the cloud system 3, and executes processing based on the job execution command. Specifically, the communication module 111 interprets the received job execution command, acquires necessary settings based on the interpretation result, reflects the acquired settings in the job settings, and starts the target application to cause the application to execute the job based on the job execution command. The application and the communication module 111 together function as a request processing unit, which is implemented by hardware and one or more programs for executing the job execution command received from the cloud system 3. That is, the request processing unit may include not only the communication module 111 but also the job history management module 112, the job history storage module 113, the address information management module 114, the address information storage module 115, the information input and output module 116, the job setting management module 117, and the job execution module 118.

The job history management module 112 manages the job history in a memory such as the HDD 13. The job history refers to history information registering the settings of an executed job. The job history storage module 113 stores the job history (i.e., history information) in a memory such as the HDD 13. The address information management module 114 manages the address information in a memory such as the HDD 13. The address information storage module 115 stores the address information in a memory such as the HDD 13. The information input and output module 116 displays information (e.g., the setting information) via the operation device 16, and receives settings input via the operation device 16. That is, the operation device 16 (i.e., the touch panel) outputs the setting information. The job setting management module 117 manages the settings referred to by the communication module 111 when interpreting the job execution command (i.e., the user request). The job execution module 118 includes various applications, such as a copy application, a scan application, and a FAX application, and executes various types of jobs.

Each of the above-described programs may be provided as recorded on a computer-readable recording medium, such as a compact disc (CD)-ROM or a flexible disk (FD), in an installable or executable file format. Further, the program may be provided as recorded on a computer-readable recording medium, such as a CD-recordable (R), a digital versatile disk (DVD), a Blu-ray disc (registered trademark), or a semiconductor memory. Further, the program may be installed in the corresponding device or apparatus via a network such as the Internet, or may be previously stored in a ROM or another memory of the device or apparatus.

Setting of the dictionary information will be described.

As described above, the dictionary information is stored in the cloud system 3 (e.g., the HDD 34 of the cloud service apparatus 3a). The interpretation unit 313 of the operation voice conversion unit 310 in the cloud system 3 determines whether a word or phrase included in the text data converted from the audio data matches the dictionary information. If the word or phrase in the text data matches the dictionary information, the interpretation unit 313 generates the interpretation result including the action and the parameters defined in the dictionary information. The dictionary information may be in any format as long as it is possible to generate the action and the parameters based on the dictionary information. For example, the dictionary information includes entity information, action information, and association information. The entity information associates a parameter of a job with a natural language. It is possible to register a plurality of synonyms for one parameter. The action information represents the type of the job. The association information associates a phrase uttered by the user in the natural language with the entity information, and associates the phrase uttered by the user in the natural language with the action information. The association information enables correct interpretation even if the order of utterance of the parameter or the nuance of the parameter is somewhat changed. Further, the association information may be used to generate response text of the interpretation result based on the input data.

FIG. 9 illustrates an example of the entity information, specifically the entity information corresponding to print color. In FIG. 9, a character string "printColor" represents the entity name, and character strings on the left side such as "auto_color," "monochrome," and "color" represent parameter names. Further, in FIG. 9, phrases on the right side such as "auto_color," "monochrome, black and white" and "color, full color" represent synonyms.

As understood from FIG. 9, parameters and synonyms are stored in association with each other as the entity information. That is, the synonyms are registered as well as the parameters. For example, therefore, when issuing an instruction to make monochrome copies, both utterances "Please make black-and-white copies" and "Please make monochrome copies" enable parameter setting.

FIG. 10 illustrates examples of user utterance phrases, action name, and entity information. In FIG. 10, the action name is included in a section under title "Action," and the entity information is included in a section under title "Entity." The remaining parts of FIG. 10 are examples of the user utterance phrases. FIG. 10 illustrates a display example on a screen of the display 38 of the cloud service apparatus 3a. In this example, one of the user utterance phrases is dragged, as indicated by the arrow in FIG. 10, through the operation of the operation device 39. This drag operation may be performed on a display screen of a personal computer (PC) of an administrator accessing the cloud system 3 via the network 5.

For example, the entity information to be associated with the corresponding information is selected through the above-described operation. Further, if the value is set in the selected entity information, the parameter included in the response is changed. For example, if the value is set as "SprintColor" for the utterance "Please make black-and-white copies," "printColor=monochrome" is returned as the return value. If the value is set as "SprintColor.original," "printColor=black and white" is returned as the return value, and the same contents as those of the user utterance are returned as the parameter in the response.

An overall procedure of the voice input operation of the voice operation system 100 will be described.

FIG. 11 is a sequence diagram illustrating an example of a basic overall procedure of the voice input operation performed in the voice operation system 100. FIG. 11 illustrates an exemplary operation performed when the MFP 1 has a duplex copy function and the user issues an instruction to the MFP 1 to execute duplex copying through the voice input operation via the terminal 2. In this case, the operation processing program of the terminal 2 may be started at the same time as the start-up of the terminal 2. Alternatively, the operation processing program may be started when a predetermined operation or predetermined voice input is performed on the terminal 2.

The user first utters a word or phrase to the terminal 2 to issue an instruction to the MFP 1. In the present example, the user utters a phrase "Make double-sided copies," for instance. The voice of the user is acquired as audio data by the terminal 2 (i.e., the acquisition unit 211) (step S1). The terminal 2 (i.e., the communication control unit 212) transmits the audio data of the utterance "Make double-sided copies" to the cloud system 3 (step S2). In this step, the terminal 2 (i.e., the communication control unit 212) may also transmit the device ID of the terminal 2 to the cloud system 3.

In the cloud system 3, the operation voice conversion unit 310 (i.e., the acquisition unit 311) acquires the data transmitted from the terminal 2. Then, the operation voice conversion unit 310 (i.e., the text conversion unit 312) converts the audio data of the utterance "Make double-sided copies" into text data, i.e., performs a text data conversion process (step S3).

In the present example, the operation voice conversion unit 310 (i.e., the interpretation unit 313) then requests the voice assistant unit 320 (i.e., the providing unit 321) to transmit the dictionary information, and acquires the dictionary information from the voice assistant unit 320 (i.e., the providing unit 321) (step S4).

Further, the operation voice conversion unit 310 (i.e., the interpretation unit 313) interprets the text data based on the acquired dictionary information (step S5). In the present example, the text data includes the phrase "Make double-sided copies." Thus, the operation voice conversion unit 310 (i.e., the interpretation unit 313) interprets that the type (i.e., action) of the job is an action requesting the MFP 1 to execute copying (i.e., ACTION: COPY_EXECUTE). Further, the contents (i.e., parameters) of the action include double-sided. Thus, the operation voice conversion unit 310 (i.e., the interpretation unit 313) interprets that the print side is double-sided (i.e., PARAMETER: PRINT SIDE=DOUBLE-SIDED). The operation voice conversion unit 310 (i.e., the interpretation unit 313) thus interprets, based on the text data, the type (i.e., action) and the contents (i.e., parameters) of the job specified by the user.

The operation voice conversion unit 310 (i.e., the interpretation unit 313) transmits the interpretation result to the management unit 330 (step S6). In this step, the operation voice conversion unit 310 (i.e., the interpretation unit 313) may transmit the device ID of the terminal 2 (i.e., the source of the transmitted audio data) to the management unit 330 in association with the interpretation result.

The management unit 330 (i.e., the interpretation result conversion unit 332) converts the interpretation result acquired from the operation voice conversion unit 310 into a job execution command to the MFP 1 (step S7). TABLE 1 given below illustrates examples of the interpretation result and the job execution command converted from the interpretation result. Information as in TABLE 1 may be stored in a memory such as the HDD 34 of the cloud service apparatus 3a such that the management unit 330 (i.e., the interpretation result conversion unit 332) refers to the stored information to convert the interpretation result into the job execution command.

TABLE 1

| Name | Value | Processing of application |
|---|---|---|
| Action | COPY_EXECUTE | Execute copy job |
| | SCAN_EXECUTE | Execute scan job |
| | PRINT_EXECUTE | Execute print job |
| | FAX_EXECUTE | Execute FAX job |
| Parameter | PRINT SIDE | Change setting value of print side |
| | QUANTITY | Change setting value of quantity |
| | *Other parameters specifiable as job setting values | |

In the examples of TABLE 1, "COPY_EXECUTE," "SCAN_EXECUTE," "PRINT_EXECUTE," and "FAX_EXECUTE" are given as examples of the action, and "PRINT SIDE" and "QUANTITY" are given as examples of the parameter. Examples of the parameter include all other parameters specifiable as job setting values.

The management unit 330 (i.e., the interpretation result conversion unit 332) converts the interpretation result of the action "COPY_EXECUTE" into a job execution command to the MFP 1 to execute the copy job. The management unit 330 (i.e., the interpretation result conversion unit 332) similarly converts the interpretation result of the action "SCAN_EXECUTE" into a job execution command to the MFP 1 to execute the scan job, converts the interpretation result of the action "PRINT_EXECUTE" into a job execution command to the MFP 1 to execute the print job, and converts the interpretation result of the action "FAX_EXECUTE" into a job execution command to the MFP 1 to execute the FAX job.

The above-described jobs are basic jobs executed in the MFP 1. However, the jobs interpretable by the cloud system 3 are not limited to the above-described jobs, and may include, for example, a job of causing a communication target (e.g., the MFP 1) to collect and transmit the apparatus information thereof to the cloud system 3 and a job of causing a display of the communication target to display predetermined information stored in a memory of the communication target.

Further, if the interpretation result includes the parameter "print side," the management unit 330 (i.e., the interpretation result conversion unit 332) converts the interpretation result into a job execution command to the MFP 1 to change the setting value of the print side. Similarly, if the interpretation result includes the parameter "quantity," the management unit 330 (i.e., the interpretation result conversion unit 332) converts the interpretation result into a job execution command to the MFP 1 to change the setting value of the quantity.

That is, the management unit 330 (i.e., the interpretation result conversion unit 332) converts the interpretation result into the job execution command by determining the intention of the user, such as the type of job to be executed by the MFP 1, for example, based on the information included in the action of the interpretation result, and determining the value included in the parameter of the interpretation result as the job setting value.

The management unit 330 (i.e., the execution instruction unit 333) transmits the thus-obtained job execution command to the MFP 1 (step S8). In the present example, a job execution command "COPY_EXECUTE (PRINT SIDE=DOUBLE-SIDED)" is transmitted to the MFP 1. The management unit 330 (i.e., the execution instruction unit 333) transmits the job execution command to the MFP 1 identified by the DB management unit 337, i.e., transmits an instruction to execute the job to the MFP 1 corresponding to the apparatus ID associated with the device ID of the terminal 2 as the source of the transmitted audio data. Thereby, duplex copying is executed in the MFP 1 corresponding to the terminal 2 implemented as the smart speaker.

Feedback in an interactive operation will be described

The voice operation system 100 of the embodiment implements an interactive system that responds to user input. For example, the voice operation system 100 of the embodiment implements an interactive system by outputting two types of responses: input lack feedback and input confirmation feedback, as well as responses with fixed sentences for interaction, to respond to the operation of the MFP 1.

The input lack feedback is a response output when the information for use in executing the job is incomplete. The input lack feedback is output when the result of user input is not recognized or when a necessary parameter is missing (i.e., unspecified). That is, it is unnecessary to output the input lack feedback when a parameter other than the necessary parameter is unspecified. The input lack feedback may be applied not only to the process of checking with the user about the parameter but also to the process of checking with the user about the function to be used, such as the copy function or the scan function.

The cloud system 3 may check necessary settings depending on the type of the information processing apparatus (i.e., the MFP 1 in the present example) currently in communication with the cloud system 3, and may set the parameters of the information processing apparatus. For example, the management unit 330 (i.e., the apparatus information acquisition unit 334) of the cloud system 3 may acquire the apparatus information representing the type and functions of the information processing apparatus at a predetermined time after the communication with the information processing apparatus is established. Then, the operation voice conversion unit 310 (the output unit 314) may receive the apparatus information and output the apparatus information to the terminal 2 (i.e., the smart speaker). With the feedback unit 213, the terminal 2 is capable of checking with the user about the settings. Alternatively, the feedback unit 213 may determine the parameters, for example. Specifically, in the case of the MFP 1 of the present example, the terminal 2 may check with the user about the functions of the MFP 1, such as the copy function, the print function, the scan function, and the FAX function. Further, the terminal 2 may check with the user about which one of the functions of the MFP 1, such as the copy function, the print function, the scan function, and the FAX function, is to be used. Further, the necessary parameter may be changed in accordance with the setting condition specified by the user. For example, if the setting condition specified by the user is variable magnification printing, the print sheet size is set as the necessary parameter. Further, if the setting condition specified by the user is duplex printing, the setting of whether to print one side or two sides of the document is set as the necessary parameter. Further, if the setting condition specified by the user is bookbind printing, settings such as the finished size and the number of pages to be included in one page are set as the necessary parameters.

The input confirmation feedback is a response output when the information for use in executing the job is complete. For example, the input confirmation feedback is output when all necessary parameters are specified by the user. Further, the input confirmation feedback may be output to prompt the user to select between executing the job with the current setting values and changing the setting values. To check with the user whether to execute the job with the current setting values, each of the parameters specified by the user may be output as sound regardless of whether the parameter is a necessary parameter or not.

Information about which one of the parameters is a necessary parameter is previously stored in the cloud system 3 (i.e., a memory of the cloud service apparatus 3a, such as the HDD 34, for example). The necessary parameters stored in the memory (e.g., the HDD 34) may be changed as appropriate with the operation device 39 of the cloud service apparatus 3a or a PC accessible to the cloud service apparatus 3a via the network 5, for example. Based on the necessary parameters stored in the memory (e.g., the HDD 34), the management unit 330 (i.e., the execution determination unit 335) determines whether the action and the parameters transmitted from the operation voice conversion unit 310 meet the necessary parameters.

A procedure of the interactive operation will be described.

Figure 12:
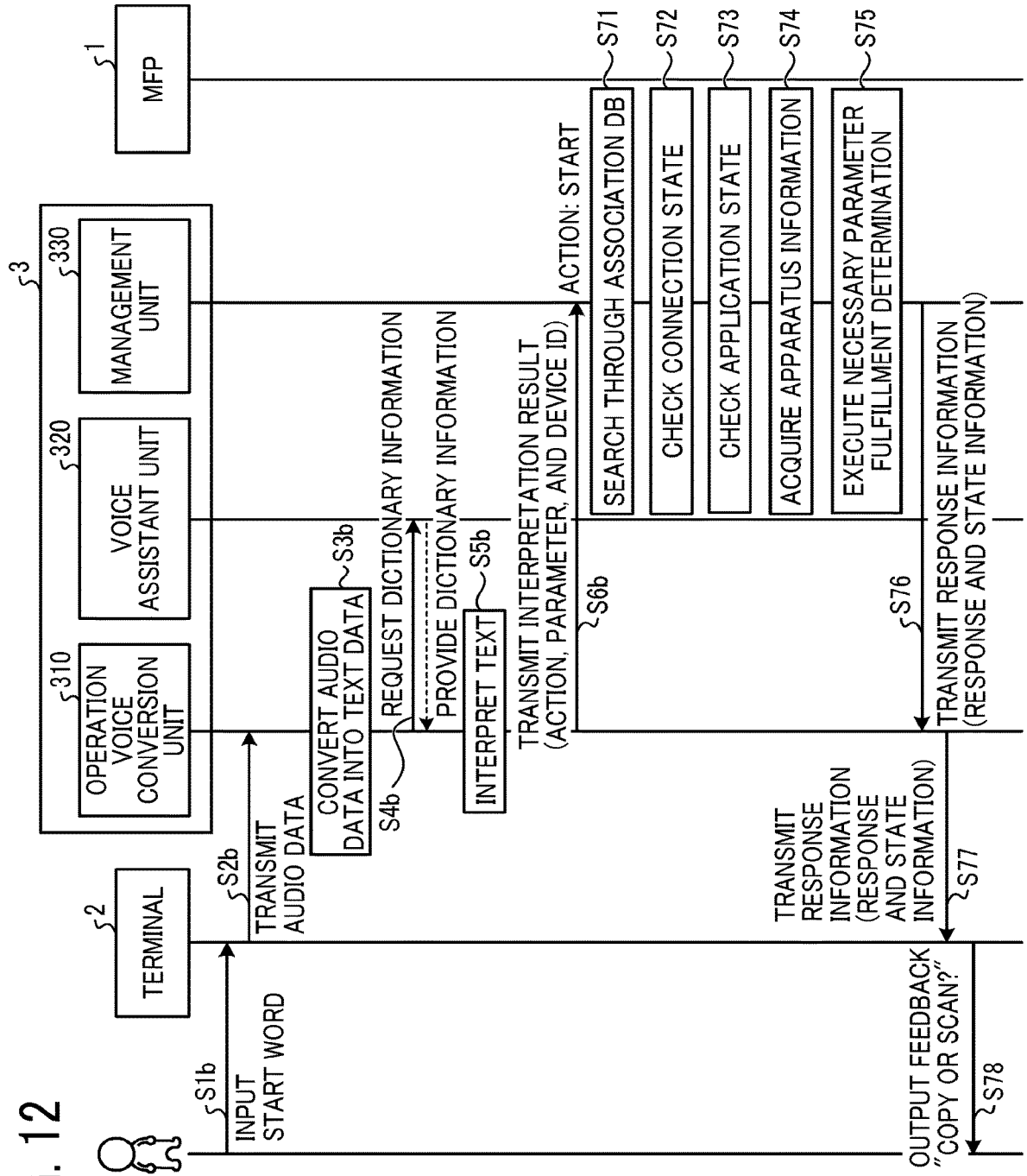
FIG. 12 is a sequence diagram illustrating an example of an operation of the voice operation system of the embodiment to start a voice assistant program to operate the MFP through user interaction with the voice operation system.
Figure 13:
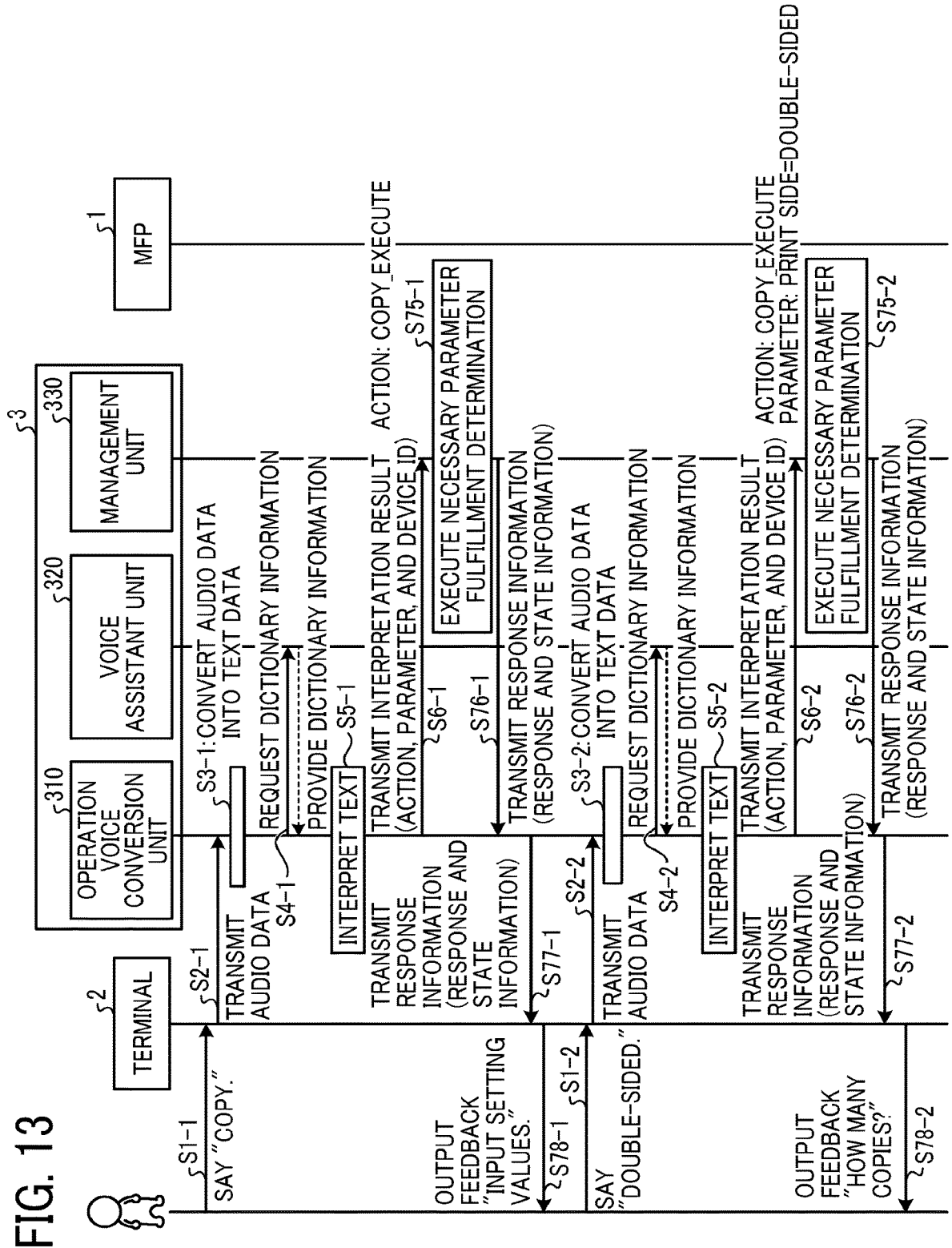
FIGS. 13 to 15 are sequence diagrams illustrating an example of an interactive operation of the voice operation system of the embodiment performed after the start-up of the voice assistant program to operate the MFP through the user interaction with the voice operation system.
Figure 14:
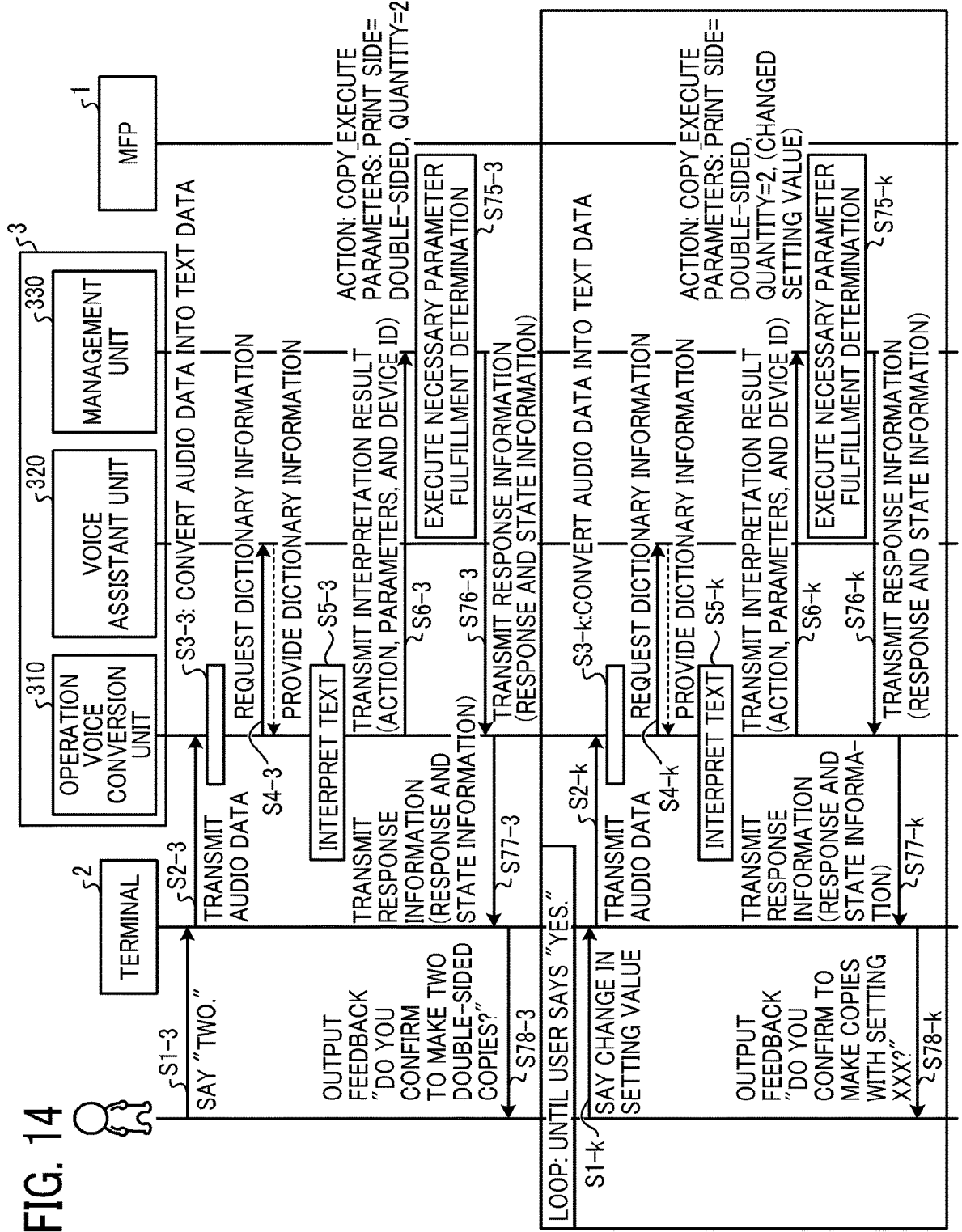
Figure 15:
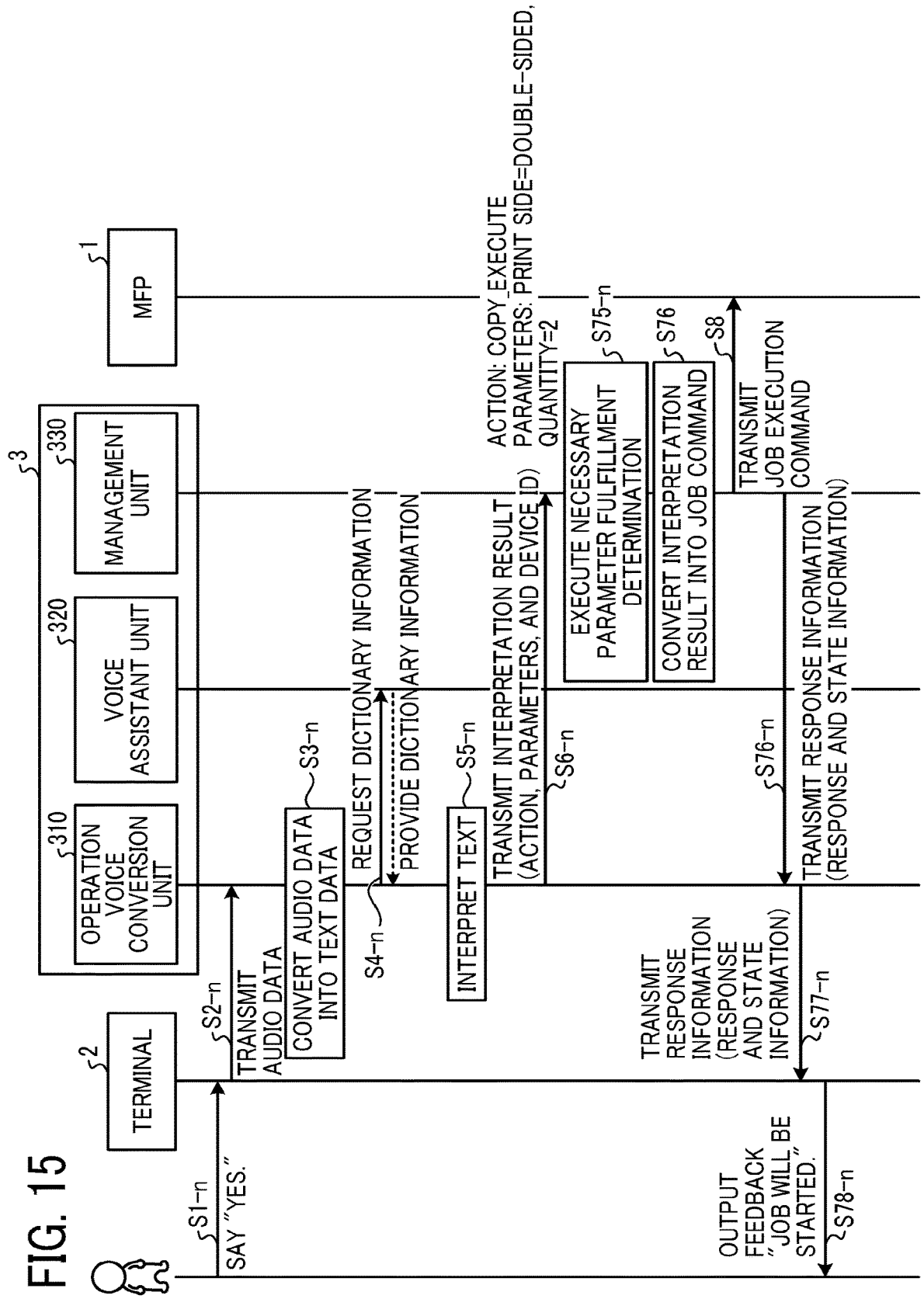

FIGS. 12 to 15 are sequence diagrams illustrating an example of an overall procedure of an operation performed in the voice operation system 100 to operate the MFP 1 based on interaction between the user and the voice operation system 100. FIG. 12 illustrates a procedure of an operation performed to start the voice assistant program. FIGS. 13 to 15 illustrate a procedure of an interactive operation performed after the voice assistant program is started.

The operation of the MFP 1 based on the interaction with the voice operation system 100 involves the management of the interaction session, which will be described later. The following description will be given of an example in which an instruction to execute an operation of making two double-sided monochrome copies is issued by the user via the terminal 2. In this example, the quantity (i.e., two) is a necessary parameter. However, the necessary parameter is not limited to the quantity, and a plurality of parameters such as monochrome, color, and sheet size may be set as necessary parameters.

The user first performs an operation of starting the operation processing program of the terminal 2, and performs voice input by uttering a start word to the terminal 2, for example (step S1b). In this step, the user utters a start word for starting the voice assistant program, to thereby start the voice assistant program. The terminal 2 (i.e., the communication control unit 212) transmits audio data of the start word to the cloud system 3 (i.e., the operation voice conversion unit 310) (step S2b).

In the cloud system 3, the operation voice conversion unit 310 (i.e., the acquisition unit 311) acquires the data transmitted from the terminal 2. Then, the operation voice conversion unit 310 (i.e., the text conversion unit 312) converts the audio data into text data, i.e., performs the text data conversion process (step S3b).

The operation voice conversion unit 310 (i.e., the interpretation unit 313) requests the voice assistant unit 320 (i.e., the providing unit 321) to transmit the dictionary information, and acquires the dictionary information from the voice assistant unit 320 (i.e., the providing unit 321) (step S4b).

The operation voice conversion unit 310 (i.e., the interpretation unit 313) further interprets the text data based on the acquired dictionary information (step S5b).

The operation voice conversion unit 310 (i.e., the interpretation unit 313) then transmits the interpretation result to the management unit 330 (step S6b).

Then, the management unit 330 executes, as necessary, processes such as search through the association DB 350 (step S71), check of the connection state (step S72), check of the application state (step S73), and acquisition of the apparatus information (step S74). The order of these processes may be changed as appropriate. Further, if any of these processes is performed at a different time, the process may be omitted here.

In the search through the association DB 350 (step S71), the management unit 330 (i.e., the DB management unit 337) searches through the association DB 350 to acquire the apparatus ID of the MFP 1 corresponding to the acquired device ID of the terminal 2. If the apparatus ID of the MFP 1 associated with the device ID fails to be retrieved in this search, the management unit 330 (i.e., the notification unit 336) notifies the user, via the operation voice conversion unit 310 (i.e., the output unit 314), that the terminal 2 is not associated with the communication target (i.e., the MFP 1). For example, the management unit 330 (i.e., the notification unit 336) generates response information including a response "This device is not associated with the apparatus." In this case, the management unit 330 (i.e., the notification unit 336) may include, in the response, guidance on how to associate the device with the communication target. The process of step S71 may be executed at another time when the device ID of the terminal 2 is acquired.

In the check of the connection state (step S72), the management unit 330 checks the apparatus state of the communication target (i.e., the MFP 1 in the present example). For example, the DB management unit 337 refers to the previously acquired apparatus information stored in the apparatus information DB 360, or the apparatus information acquisition unit 334 acquires the apparatus information from the MFP 1 as the communication target. The check of the apparatus state is performed to determine whether it is possible to communicate with the MFP 1 as the communication target and whether the MFP 1 is available, for example. If the connection with the MFP 1 associated with the device ID (i.e., the MFP to be checked) is not established, or if the MFP 1 is being started up and thus is unavailable, for example, the management unit 330 (i.e., the notification unit 336) notifies the user of unavailability of the MFP 1 via the operation voice conversion unit 310 (i.e., the output unit 314). For example, the management unit 330 (i.e., the notification unit 336) generates response information including a response "The apparatus is off-line" or "The apparatus is setting up," and notifies the user of the response information. In this case, the management unit 330 (i.e., the notification unit 336) may include, in the response, guidance on how to respond to the situation. The check of the apparatus state may be executed at another time when the action, the parameters, and the device ID are acquired from the operation voice conversion unit 310 (i.e., the interpretation unit 313).

In the check of the application state (step S73), the management unit 330 checks with the MFP 1 (i.e., the communication target) about the state of the application that executes the function specified by the user. For example, the DB management unit 337 refers to the previously acquired apparatus information stored in the apparatus information DB 360, or the apparatus information acquisition unit 334 acquires the apparatus information from the MFP 1 as the communication target. The check of the application state is performed to determine whether the application is installed in the MFP 1 and whether the application is in an executable state, for example.

If the user specifies the execution of the copy function, and if the application for the copy function is not installed in the MFP 1 associated with the device ID of the terminal 2 or is being started up and thus is unavailable, for example, the management unit 330 (i.e., the notification unit 336) notifies the user of unavailability of the application via the operation voice conversion unit 310 (i.e., the output unit 314). For example, the management unit 330 (i.e., the notification unit 336) generates response information including a response "The application is not installed" or "The application is unavailable now," and notifies the user of the response information. In this case, the management unit 330 (i.e., the notification unit 336) may include, in the response, guidance on how to respond to the situation. The check of the application state may be executed at another time when the action, the parameters, and the device ID are acquired from the operation voice conversion unit 310 (the interpretation unit 313).

In the acquisition of the apparatus information (step S74), the management unit 330 acquires the apparatus information of the communication target (i.e., the MFP 1 in the present example). For example, the DB management unit 337 acquires the previously acquired apparatus information stored in the apparatus information DB 360. Alternatively, the apparatus information acquisition unit 334 may acquire the apparatus information from the MFP 1 as the communication target. The apparatus state acquired in this step is used to determine whether the MFP 1 as the communication target is capable of executing the job with the job type and the job conditions specified by the user, for example.

If the above-described processes are completed after the start-up operation, the management unit 330 (i.e., the execution determination unit 335) executes necessary parameter fulfillment determination (step S75). In the necessary parameter fulfillment determination, based on the action and the parameters of the interpretation result, the management unit 330 (i.e., the execution determination unit 335) determines whether all conditions for the job execution are met.

If the job type and the necessary job setting conditions are all specified when the instruction to start the voice assistant program is issued, the job execution command may be transmitted to the MFP 1 with omission of the following steps of the input lack feedback.

At this stage, the instruction to start the voice assistant program has been issued in voice, but a plurality of actions and parameters of the MFP 1 are not specified by the user. Therefore, the management unit 330 (i.e., the execution determination unit 335) determines that the necessary parameters are not met. If any of the necessary conditions is unspecified when the instruction to start the voice assistant program is issued, the management unit 330 (i.e., the execution determination unit 335) similarly determines that the necessary parameters are not met. Therefore, the management unit 330 (i.e., the notification unit 336) generates response information, and transmits the response information to the terminal 2 via the operation voice conversion unit 310 (i.e., the output unit 314) (steps S76 and S77).

The management unit 330 (i.e., the DB management unit 337) manages the communication session with the terminal 2 in the management DB 340. When transmitting the response information to the terminal 2, the management unit 330 (i.e., the notification unit 336) also transmits state information to the terminal 2. Herein, the state information is information indicating that the session is ongoing. When the cloud system 3 transmits an inquiry to the terminal 2 in a subsequent step, the cloud system 3 similarly transmits the state information to the terminal 2 together with the inquiry, although description thereof will be omitted as appropriate.

The response information may include text data, audio data, or image data of the inquiry to the user. In the present example, audio data of an inquiry "Copy or scan?" is transmitted, for example. Thereby, the terminal 2 (i.e., the feedback unit 213) outputs audio feedback with the message "Copy or scan?" (step S78).

The feedback is not limited the above-described message, and may be any message prompting the user to input (i.e., specify) the job type or the job setting condition. Further, the feedback to the user is not limited to the audio output, and may be displayed as text or an image on the touch panel 27 of the terminal 2. In this case, data such as text data or image data (i.e., display information) is transmitted to the terminal 2.

If the user utters a word "Copy" after step S78 or when issuing the instruction to start the voice assistant program, the voice of the user is acquired as audio data by the terminal 2 (i.e., the acquisition unit 211) (step S1-1). The terminal 2 (i.e., the communication control unit 212) transmits the audio data of the utterance "Copy" to the cloud system 3 (step S2-1). In this step, the terminal 2 (i.e., the communication control unit 212) also transmits the device ID of the terminal 2 to the cloud system 3.

In the cloud system 3, the operation voice conversion unit 310 (i.e., the acquisition unit 311) acquires the audio data. Thereafter, similarly as in steps S3b to S5b, the operation voice conversion unit 310 executes the processes to the interpretation of the text data (steps S3-1 to S5-1), and transmits the interpretation result to the management unit 330 (step S6-1). In this step, the action "COPY_EXECUTE" corresponding to the utterance "Copy" is transmitted to the management unit 330 as the interpretation result.

Then, the management unit 330 (i.e., the execution determination unit 335) again executes the necessary parameter fulfillment determination (step S75-1). In the present example, the user has uttered the word "Copy," but the setting values of the necessary parameters such as the number of copies are unknown.

The cloud system 3 therefore inquires of the terminal 2 about the unspecified parameters. Specifically, since the setting values are unspecified at this stage, the management unit 330 (i.e., the notification unit 336) generates response information including a response "Input setting values," and transmits audio data of the response "Input setting values" to the terminal 2 via the operation voice conversion unit 310 (i.e., the output unit 314) (steps S75-1 to S77-1). Then, the terminal 2 (i.e., the feedback unit 213) outputs sound "Input setting values" (step S78-1). In this case, too, the terminal 2 (i.e., the feedback unit 213) may display text "Input setting values" on the touch panel 27, for example, as well as outputting the audio feedback.

Then, in response to the input lack feedback, the user utters a phrase "Double-sided," for example, and the voice of the user is acquired as audio data by the terminal 2 (i.e., the acquisition unit 211) (step S1-2). The terminal 2 (i.e., the communication control unit 212) transmits the audio data of the utterance "Double-sided" to the cloud system 3 (step S2-2). In this step, the terminal 2 (i.e., the communication control unit 212) also transmits the device ID of the terminal 2 to the cloud system 3.

In the cloud system 3, the operation voice conversion unit 310 (i.e., the acquisition unit 311) acquires the audio data. Thereafter, similarly as in steps S3b to S5b, the operation voice conversion unit 310 executes the processes to the interpretation of the text data (steps S3-2 to S5-2), and transmits the interpretation result to the management unit 330 (step S6-2).

In this step, the operation voice conversion unit 310 (i.e., the interpretation unit 313) generates the parameter "PRINT SIDE=DOUBLE-SIDED" as the interpretation result, and transmits the interpretation result to the management unit 330.

Then, the management unit 330 (i.e., the execution determination unit 335) again executes the necessary parameter fulfillment determination (step S75-2). Specifically, the management unit 330 (i.e., the DB management unit 337) stores the interpretation result of the last utterance in the management DB 340, for example, and combines the interpretation result of the last utterance and the interpretation result of the current utterance to complete the action and the parameter. The management unit 330 (i.e., the execution determination unit 335) again executes the necessary parameter fulfillment determination based on the combined interpretation results.

In the above-described example, the management unit 330 combines the interpretation result of the last utterance and the interpretation result of the current utterance. However, the configuration is not limited thereto. For example, the operation voice conversion unit 310 may transmit, to the management unit 330, an interpretation result combining the action "COPY_EXECUTE" in the last utterance and the parameter "PRINT SIDE=DOUBLE-SIDED" in the current utterance.

In the present example, the user has uttered the phrases "Copy" and "Double-sided," but another necessary parameter such as the number of copies is unknown. The management unit 330 (i.e., the execution determination unit 335) therefore determines the lack of a necessary parameter at this stage, too (step S75-2).

The cloud system 3 therefore inquires of the terminal 2 about the unspecified parameter. Steps of inquiring of the terminal 2 about the unspecified parameter are similar to the above-described steps. That is, the management unit 330 (i.e., the notification unit 336) generates response information including a response "How many copies?" and transmits audio data of the response "How many copies?" to the terminal 2 via the operation voice conversion unit 310 (i.e., the output unit 314) (steps S75-2 to S77-2). Then, the terminal 2 (i.e., the feedback unit 213) outputs sound "How many copies?" (step S78-2). In this case, too, the terminal 2 (i.e., the feedback unit 213) may display text "How many copies?" on the touch panel 27, for example, as well as outputting the audio feedback.

Then, in response to the input lack feedback, the user utters a word "Two," for example. Thereafter, similarly as in the foregoing steps, audio data of the utterance is transmitted from the terminal 2 to the cloud system 3, and the necessary parameter fulfillment determination is executed in the cloud system 3. That is, the voice of the user is acquired as audio data by the terminal 2 (i.e., the acquisition unit 211) (step S1-3). The terminal 2 (i.e., the communication control unit 212) transmits the audio data of the utterance "Two" to the cloud system 3 (step S2-3). In this step, the terminal 2 (i.e., the communication control unit 212) also transmits the device ID of the terminal 2 to the cloud system 3.

In the cloud system 3, the operation voice conversion unit 310 (i.e., the acquisition unit 311) acquires the audio data. Thereafter, similarly as in steps S3b to S5b, the operation voice conversion unit 310 executes the processes to the interpretation of the text data (steps S3-3 to S5-3), and transmits the interpretation result to the management unit 330 (step S6-3).

In the present example, the operation voice conversion unit 310 (i.e., the interpretation unit 313) generates the parameter "QUANTITY=2" as the interpretation result, and transmits the interpretation result to the management unit 330.

Then, the management unit 330 (i.e., the execution determination unit 335) again executes the necessary parameter fulfillment determination (step S75-3). Specifically, the management unit 330 (i.e., the DB management unit 337) combines the interpretation result of the last utterance and the interpretation result of the current utterance to complete the action and the parameters. That is, in the present example, the management unit 330 (i.e., the DB management unit 337) completes the action "COPY_EXECUTE" and the parameters "PRINT SIDE=DOUBLE-SIDED, QUANTITY=2." The management unit 330 (i.e., the execution determination unit 335) again executes the necessary parameter fulfillment determination based on the combined interpretation results. In the present example, with the user utterance "Two," the unspecified necessary parameter of the copy job is specified.

In the present example, the management unit 330 (i.e., the notification unit 336) then generates response information including a response "Do you confirm to make two double-sided copies?" for the input confirmation feedback, and transmits audio data of the response "Do you confirm to make two double-sided copies?" to the terminal 2 via the operation voice conversion unit 310 (i.e., the output unit 314) (steps S75-3 to S77-3). Then, the terminal 2 (i.e., the feedback unit 213) outputs sound "Do you confirm to make two double-sided copies?" (step S78-3). In this case, too, the terminal 2 (i.e., the feedback unit 213) may display text "Do you confirm to make two double-sided copies?" on the touch panel 27, for example, as well as outputting the audio feedback. In this step, instead of outputting the text data or the audio data included in the response information, the terminal 2 may generate output information by combining text data items stored in a memory of the terminal 2 based on information included in the response information.

Then, in response to the input confirmation feedback, the user utters an instruction to the terminal 2 to change a setting value or start copying. If the user utters the instruction to change the setting value (step S1-k), audio data of the uttered instruction to change the setting value is transmitted to the cloud system 3 from the terminal 2 (step S2-k). Then, the cloud system 3 changes the setting value, and transmits audio feedback to the terminal 2 to notify that the setting value has been changed (steps S3-k to S77-k). Then, the terminal 2 outputs audio feedback with a message such as "Do you confirm to make copies with setting XXX?" for example, to check with the user whether to start copying with the changed setting value (step S78-k).

Thereafter, if the user again utters the instruction to change the setting value, the above-described sequence is repeated. After the output of the audio feedback "Do you confirm to make two double-sided copies?" therefore, this sequence is repeated k times, i.e., the number of times by which the user utters the instruction to change the setting value.

If the user utters the instruction to start copying with a response "Yes," for example, the n-th sequence illustrated in FIG. 15 takes place. That is, the voice of the user is acquired as audio data by the terminal 2 (i.e., the acquisition unit 211) (step S1-n). The terminal 2 (i.e., the communication control unit 212) transmits the audio data of the utterance "Yes" to the cloud system 3 (step S2-n). In this step, the terminal 2 (i.e., the communication control unit 212) also transmits the device ID of the terminal 2 to the cloud system 3.

In the cloud system 3, the operation voice conversion unit 310 (i.e., the acquisition unit 311) acquires the audio data. Thereafter, similarly as in steps S3b to S5b, the operation voice conversion unit 310 executes the processes to the interpretation of the text data (steps S3-n to S5-n), and transmits the interpretation result to the management unit 330 (step S6-n).

In this step, the operation voice conversion unit 310 (i.e., the interpretation unit 313) recognizes the copy start instruction and transmits the interpretation result to the management unit 330. Then, the management unit 330 (i.e., the execution determination unit 335) determines that the necessary parameters are specified (step S75-n).

Thereby, the management unit 330 (i.e., the interpretation result conversion unit 332) converts the interpretation result into a job execution command to the MFP 1 (step S76). The management unit 330 (i.e., the execution instruction unit 333) then transmits the job execution command obtained through the conversion process to the MFP 1 (step S8). With the voice input operation, therefore, the MFP 1 is controlled to execute copying. The management unit 330 (i.e., the notification unit 336) further generates response information, and transmits the response information to the terminal 2 via the operation voice conversion unit 310 (i.e., the output unit 314) (steps S76-n and S77-n). Then, the terminal 2 (i.e., the feedback unit 213) outputs audio feedback "Job will be started" (step S78-n).

The above-described state information represents the state of the session. For example, if the job execution command to the MFP 1 is not transmitted yet and the user is performing the job setting process, state information indicating the continuation of the session is transmitted. If the transmission of the job execution command to the MFP 1 is completed, state information indicating the completion of the session is transmitted.

However, the state information is not limited thereto, and may be more detailed information of the session state. The operation voice conversion unit 310 or the management unit 330 determines whether to continue or complete the session in accordance with the state information. That is, if the user specifies the job setting conditions with a plurality of utterances, and if the state information indicates that the session is ongoing, the operation voice conversion unit 310 or the management unit 330 determines that the job setting conditions belong to one job. If the state information indicates that the session is completed, the operation voice conversion unit 310 or the management unit 330 determines that the job setting condition included in the next user utterance belongs to a new job. Even if the instruction concerning the job type and the job setting conditions is issued with a plurality of utterances, therefore, the operation voice conversion unit 310 or the management unit 330 is capable of determining whether the job type and the job setting conditions belong to the same job or different jobs.

If no signal is received from the terminal 2 for at least a predetermined time, the management unit 330 may determine that the session is completed. The communication target (i.e., the MFP 1) may execute the job regardless of the continuation or discontinuation of the session. In this case, the MFP 1 as the communication target acquires the job execution command, and overwrites the job conditions currently held in the MFP 1 with the job conditions included in the acquired job execution command. In this process, all job conditions held in the MFP 1 may be deleted or reset to default conditions to set the job conditions included in the job execution command. Alternatively, if one of the job conditions held in the MFP 1 is inconsistent with the corresponding one of the job conditions included in the job execution command, the job condition held in the MFP 1 may be overwritten with the corresponding job condition in the job execution command, which is given priority. If one of the job conditions held in the MFP 1 is consistent with the corresponding one of the job conditions included in the job execution command, the job condition held in the MFP 1 may be maintained. After the job is executed, the MFP 1 may delete the job conditions included in the job execution command to reset the job conditions of the MFP 1 to the default conditions previously registered in the MFP 1.

An example of information fed back from the cloud system 3 will be described.

In the above-described example, the feedback unit 213 of the terminal 2 outputs the text data or the audio data included in the response information. However, the output information is not limited thereto. Based on information included in the response information, the feedback unit 213 may read all or parts of text data stored in a memory of the terminal 2, and may generate the output information by combining the read parts of the text data. TABLE 2 given below illustrates an example of the response information and feedback fed back to the terminal 2 from the cloud system 3.

TABLE 2

| Name | Value | Processing of application |
|---|---|---|
| Action | COPY_PARAMETER_SETTING | Prompt user to input job setting value |
|  | COPY_CONFIRM | Prompt user to confirm job setting value |
|  | COPY_EXECUTE | Execute copy job |
| Parameter | Print side | Change setting value of print side |
|  | Quantity | Change setting value of quantity |
|  | *Other parameters specifiable as job setting values |  |
| Response | Text | Feed back contents specified in text to user |

As illustrated in TABLE 2, an action such as "COPY_PARAMETER_SETTING" for prompting the user to input the job setting value or "COPY_CONFIRM" for prompting the user to confirm the job setting value, for example, is included in the response information and fed back to the terminal 2 from the cloud system 3.

The feedback unit 213 determines the feedback to be output to the user in accordance with the action, parameters, and response included in the response information. Information as in TABLE 2 may be stored in a memory of the terminal 2 such that the feedback unit 213 refers to the stored information to determine the contents of the feedback. Although TABLE 2 illustrates examples of the response information of the copy job, "PARAMETER_SETTING" for prompting the user to input the job setting value and "CONFIRM" for prompting the user to confirm the job setting value may also be used as the action in the response information of the print, scan, or FAX job similarly as in TABLE 2. The response information may include at least one of the action and parameter and the response.

Further, for example, the setting value of the print side such as single-sided or double-sided or the parameter such as the number of copies is included in the response information and fed back to the terminal 2. Further, if there is an unspecified necessary parameter, a message for prompting the user to input (i.e., specify) the unspecified necessary parameter is included in the response information as the response and fed back to the terminal 2.

An automatic selection process executed in the MFP 1 will be described.

The foregoing description has been given of a sequence of steps in which the user inputs a voice instruction to the terminal 2 to execute each setting and the cloud system 3 interprets the voice instruction and instructs the MFP 1 to execute processing based on the voice instruction.

The following description will be given of an example in which the user inputs, to the terminal 2, a voice instruction specifying previous settings (e.g., "the last settings," "the latest settings," "the usual settings," or "the settings made yesterday") such that the MFP 1 automatically selects and executes certain settings in a batch from previously executed settings. The previously executed settings are acquired from the history information managed by the MFP 1. If address setting is necessary, the address information managed by the MFP 1 is used. The information for the automatic selection process is thus managed by the MFP 1, i.e., information stored in an edge device such as the MFP 1 is used in the automatic selection process, thereby reducing the amount of information flowing through the network 5. The history information, however, may be stored in the cloud system 3, such as in the apparatus information DB 360, for example. In this case, too, the settings previously used by the user are easily read (i.e., retrieved).

In the automatic selection process, the user logs in to the MFP 1 by inputting login information to the operation device 16 of the MFP 1, for example, and inputs a voice instruction to the terminal 2. For example, the user logs in to the MFP 1 by inputting thereto a login name "Taro" as the login information, and inputs a voice instruction to the terminal 2 placed near the MFP 1. The settings executed by the MFP 1 based on the voice instruction are managed in the MFP 1 as the history information in association with the logged-in user name (i.e., "Taro" in the present example). The history information includes information such as the date and time of execution of the settings. The history information may be managed in association not with the login name but with a different type of information associated with the corresponding user, such as a login ID. Each time the settings are executed by the MFP 1 based on the voice instruction input by the logged-in user, the settings are recorded as the history information.

For example, if the logged-in user named "Taro" inputs a voice instruction "Print with the last settings" to the terminal 2, the voice instruction is transmitted to the cloud system 3 from the terminal 2. Then, the cloud system 3 converts a part "with the last settings" of the voice instruction "Print with the last settings" into an instruction "deploy the last settings," and transmits job execution commands "deploy the last settings" and "print" to the MFP 1. In this case, the cloud system 3 may interpret the voice instruction from the user as an action "PRINT_EXECUTE" and a parameter "DEPLOY LAST SETTINGS," for example. If the history information is stored in the cloud system 3, one or more corresponding sets of settings are read from the history information stored in a memory such as the HDD 34, and are transmitted to the MFP 1.

In the MFP 1, the communication module 111 receives the instruction "deploy the last settings," and outputs the corresponding settings to the screen of the LCD of the operation device 16 based on condition information. The corresponding settings are included in the history information stored in a memory such as the HDD 13. The condition information defines requests such as a request expressed as "the last," and is used to select history records from the history information. In the present example, the instruction to execute printing is issued. Thus, a print setting screen is displayed on the screen of the operation device 16 to allow the user to execute the print process via the print setting screen. If the settings are acquired from the cloud system 3, the acquired settings may be output to the screen.

The method of reading the settings from the history information may be changed depending on the voice instruction. For example, if the voice instruction includes the expression "the latest settings," the cloud system 3 may transmit a job execution command "deploy the latest settings" to the MFP 1. In this case, the latest history record of the history information is output to the screen of the operation device 16. Further, if the voice instruction includes the expression "the usual settings," the cloud system 3 may transmit a job execution command "deploy the usual settings" to the MFP 1. In this case, the most frequently used history record of the history information is output to the screen of the operation device 16. Herein, the MFP 1 may output the settings of the most frequently used history record of the history information. Alternatively, the MFP 1 may output the settings of a plurality of history records used at least at a predetermined frequency, and may receive selection of the settings of one of the plurality of history records selected by the user. Further, the MFP 1 may output the settings of a plurality of history records in order of highest frequency of use, and may receive selection of the settings of one of the plurality of history records selected by the user.

Further, if the voice instruction includes the expression "the settings made yesterday," the cloud system 3 may transmit a job execution command "deploy the settings made yesterday" to the MFP 1. In this case, the expression "yesterday" is defined in the condition information as indicating the history information of the day before the day of issuance of the voice instruction. If the received voice instruction includes a different expression specifying the time, such as "one hour ago" or "last week," instead of "yesterday," one or more sets of settings corresponding to the time condition may be acquired from the history information and output to the screen of the operation device 16. Further, one or more expressions other than the above-described expressions may also be registered in the condition information. The MFP 1 thus acquires, from the history information, one or more sets of settings corresponding to the condition specified in the voice instruction, and outputs the acquired one or more sets of settings to the screen of the operation device 16. If the history information is stored in the cloud system 3, one or more sets of settings corresponding to the condition specified in the voice instruction are similarly acquired from the history information and transmitted to the MFP 1. Further, the type of job to which the voice instruction is applicable is not limited to printing, and may be any type of job executable in the MFP 1, such as scanning or FAX communication. The history information includes history records for each type of job. If a voice instruction to execute scanning is received, history records are selected from the history information of scan jobs.

The following description will be given of a procedure of the automatic selection process executed when the job type is printing and the expression indicating the previous settings is "the last," for example.

Figure 16:
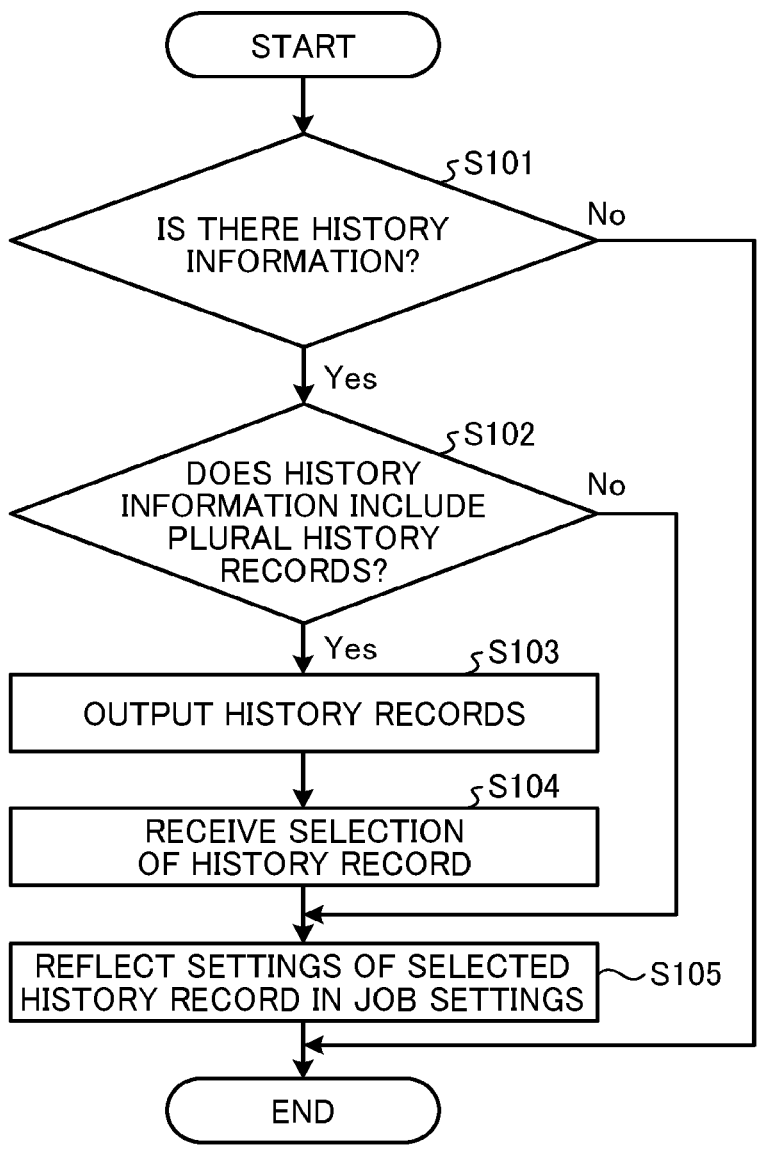
FIG. 16 is a flowchart illustrating an example of an automatic selection process executed in the MFP of the embodiment.

FIG. 16 is a flowchart illustrating an example of the automatic selection process executed in the MFP 1. In response to receipt of the instruction "deploy the last settings," the MFP 1 searches through the history information in the memory to determine whether there is history information of the logged-in user (step S101). If there is no history information of the logged-in user (No at step S101), the MFP 1 completes the automatic selection process without changing the settings on the screen of the LCD of the operation device 16. The MFP 1 may output sound or light or display information on the screen to notify the user of the absence of the history information.

If there is history information of the logged-in user (Yes at step S101), the MFP 1 determines whether the history information includes a plurality of history records (step S102). If it is determined that the history information includes a plurality of history records (Yes at step S102), the MFP 1 outputs the plurality of history records of the history information to the screen of the LCD of the operation device 16 as selection information (step S103).

The MFP 1 then receives selection of one history record selected by the user from the plurality of history records of the history information on the screen of the LCD of the operation device 16 through a touch input operation (step S104).

In response to selection of one history record from the plurality of history records of the history information, the MFP 1 reflects the settings of the selected history record in the job settings (step S105).

If it is determined at step S102 that the history information includes a single history record (No at step S102), the selection process is unnecessary. Thus, the MFP 1 skips steps S103 and S104, and proceeds to step S105 to reflect the settings of the single history record in the job settings.

Figure 19:
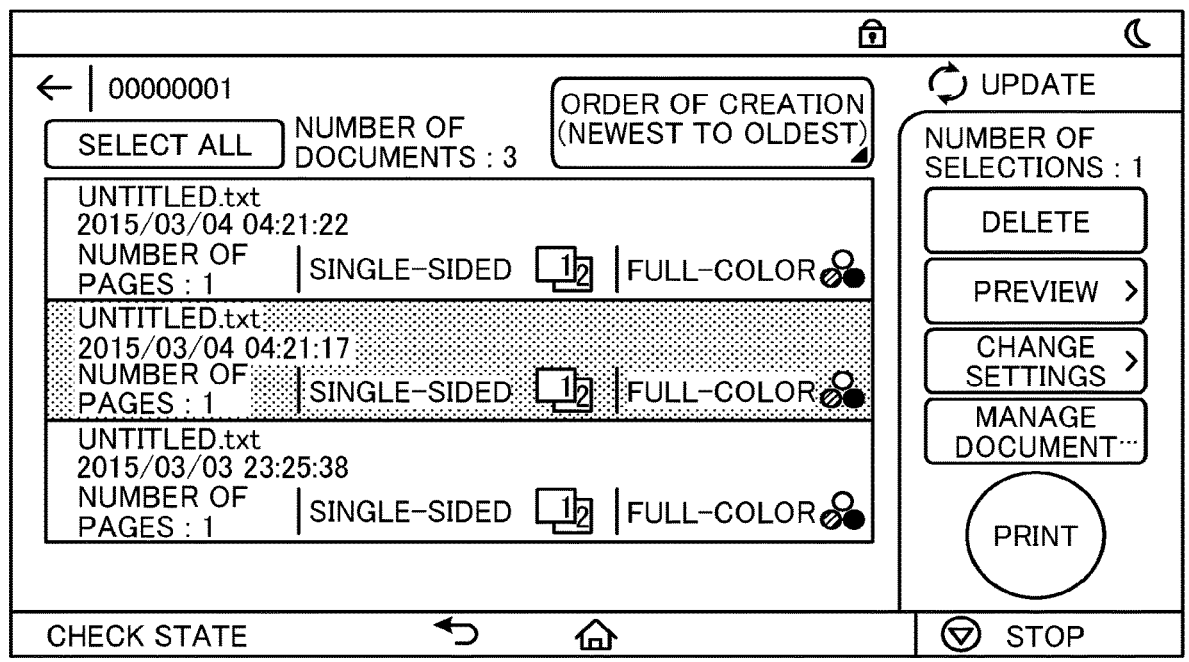
FIG. 19 is a diagram illustrating an example of an operation screen of the MFP of the embodiment.

According to the above-described automatic selection process, when the history information of the logged-in user includes a single history record, the settings of the single history record are automatically reflected in a batch in the job settings. Further, when the history information of the logged-in user includes a plurality of history records, a list of the plurality of history records is displayed on the screen of the LCD of the operation device 16. Then, the user selects therefrom one history record through the touch input operation. Thereby, the settings of the selected history record are reflected in the job settings. In the present example, the instruction to execute printing is issued. Therefore, the screen of the LCD of the operation device 16 displays the settings of print history information. Then, the user presses a start button (i.e., execute button) on the setting screen, and printing is executed with the selected settings. Alternatively, the user may input a voice instruction to the terminal 2 to execute printing. After the selected settings are reflected in the job settings, the user is able to change the job settings reflecting the selected settings by operating the operation device 16 or by inputting a voice instruction to the terminal 2. Further, if the job type acquired from the cloud system 3 is printing, an application for printing installed in the MFP 1 may be executed to display a print screen, as illustrated in FIG. 19. In this case, the history records of the history information output at step S103 may be limited to the history records output to the print screen, i.e., the history records of the print job as one of a plurality of job types.

Figure 17:
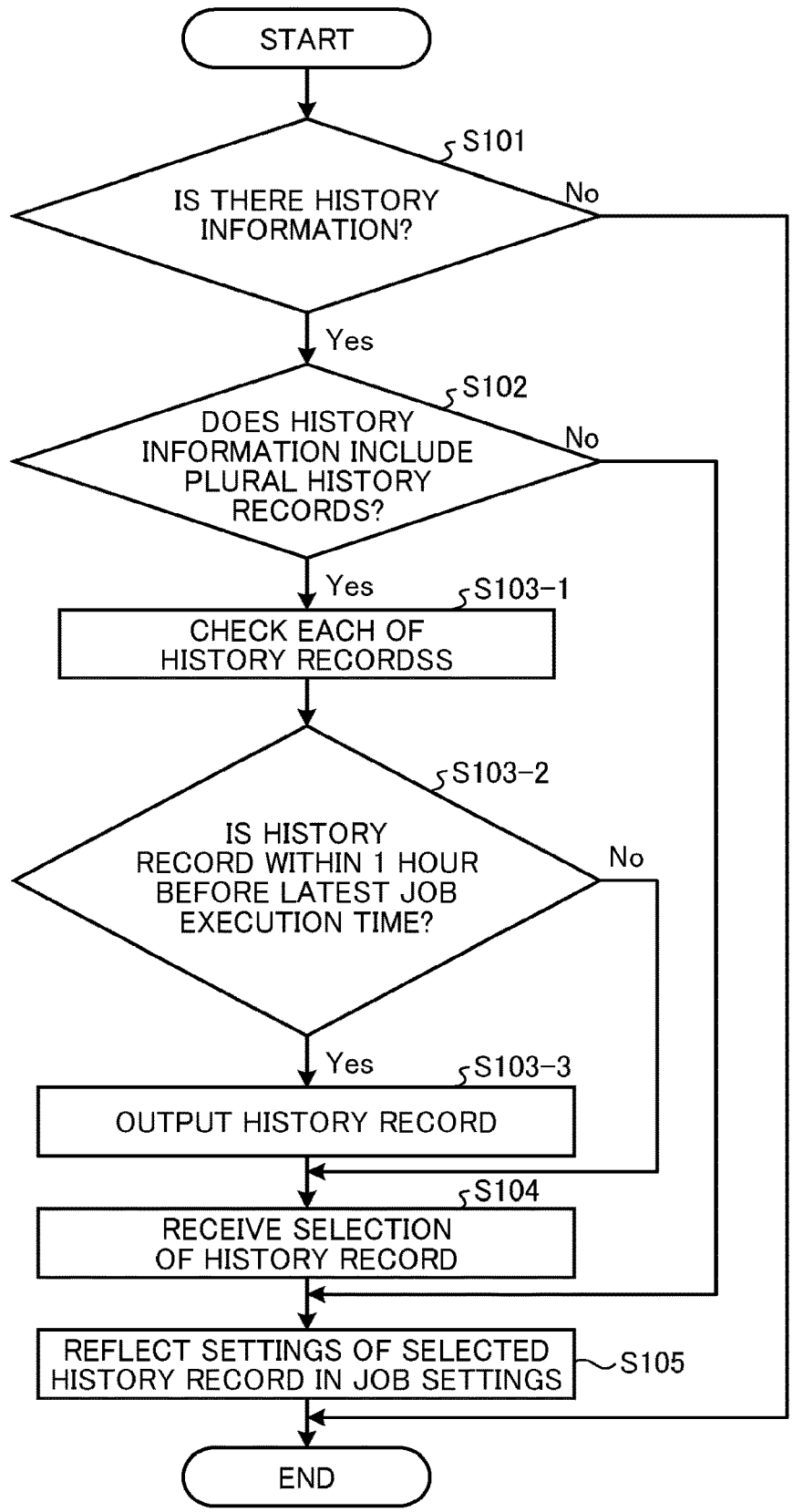
FIG. 17 is a flowchart illustrating another example of the automatic selection process executed in the MFP of the embodiment.

FIG. 17 is a flowchart illustrating another example of the automatic selection process executed in the MFP 1. This flowchart illustrates a procedure of a process of automatically outputting, to the screen, the history records within one hour before the most recent history record. For example, it is assumed now that the most recent history record is three hours before the present time, and that there are two other history records: a history record three hours and thirty minutes before the present time and a history record four hours and ten minutes before the present time. Since the history records within one hour before the most recent history record are output in this case, the history record three hours before the present time and the history record three hours and thirty minutes before the present time are displayed in a list on the screen. However, the history record four hours and ten minutes before the present time is not displayed on the screen.

In the procedure of FIG. 17, the same processes as those of FIG. 16 are denoted with the same step numbers, and description thereof will be omitted as appropriate. The following description of the procedure of FIG. 17 will focus on processes different from those of FIG. 16.

If the history information includes a plurality of history records (Yes at step S102), the MFP 1 checks each of the plurality of history records (step S103-1), and determines whether the history record is within one hour before the latest (i.e., most recent) job execution time (step S103-2).

If the history record is within one hour before the latest job execution time (Yes at step S103-2), the MFP 1 outputs the history record (step S103-3). If the history record is not within one hour before the latest job execution time (No at step S103-2), the MFP 1 skips the history record output process of step S103-3. The MFP 1 repeats the sequence of steps S103-1 to S103-3 for each of the plurality of history records.

After the completion of the sequence of steps S103-1 to S103-3 for each of the plurality of history records, the screen on the LCD of the operation device 16 of the MFP 1 displays the history records within one hour before the latest job execution time. The user selects therefrom one history record through the touch input operation similarly as in the procedure of FIG. 16.

As described above, according to the automatic selection process illustrated in FIG. 17, the history records to be output are limited to those within one hour before the latest job execution time. According to the procedure illustrated in FIG. 16, if many history records are stored for the logged-in user, all of those history records are output to the screen. It is therefore difficult for the user to select one history record from a list of those history records and find the intended settings. According to the procedure of FIG. 17, on the other hand, the history records to be output are limited to those within one hour before the latest job execution time. Consequently, the history records to be output to the screen are limited to the most recent ones, facilitating the user to find the intended settings from the list.

Figure 18:
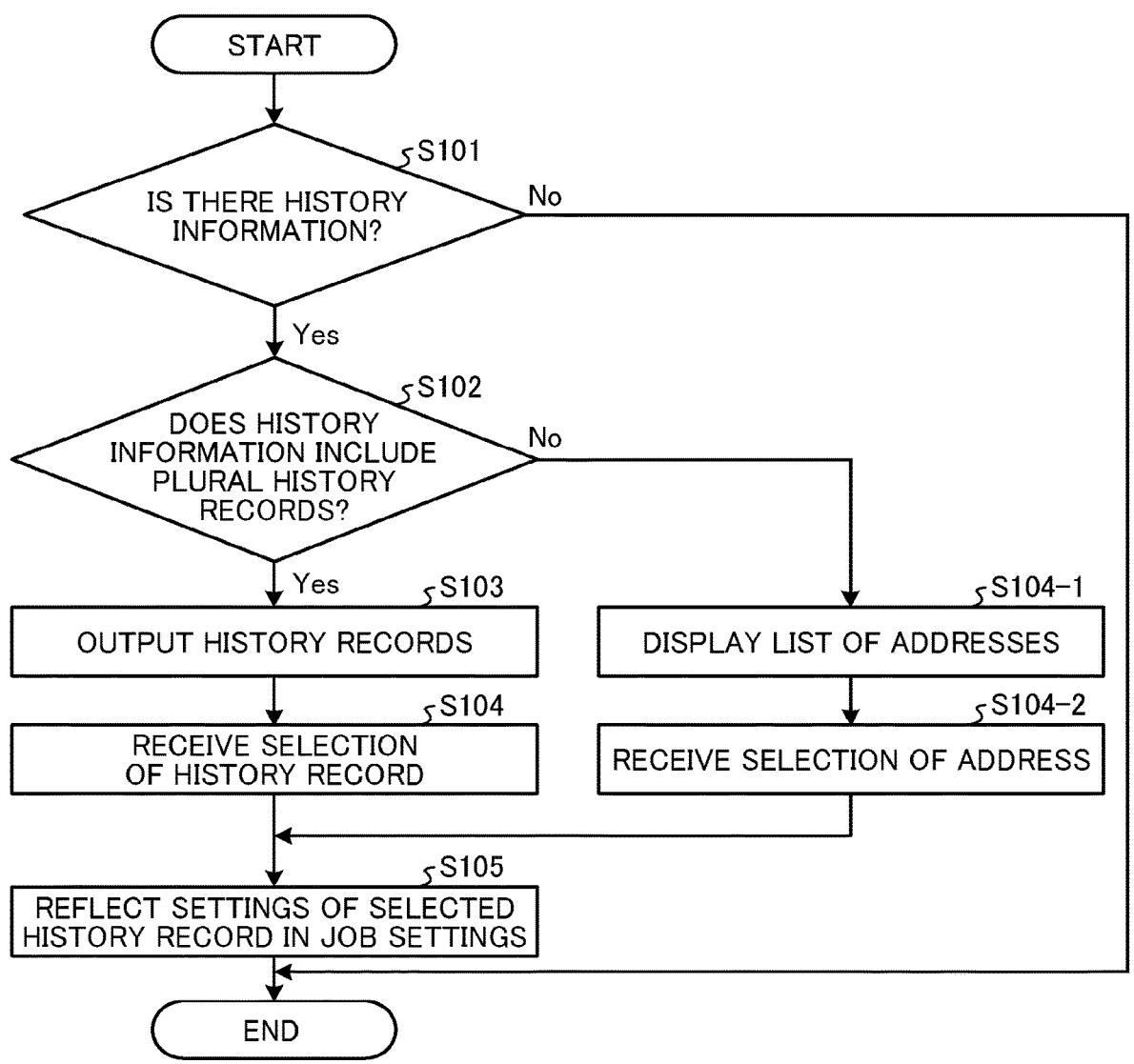
FIG. 18 is a flowchart illustrating still another example of the automatic selection process executed in the MFP of the embodiment.

FIG. 18 is a flowchart illustrating still another example of the automatic selection process executed in the MFP 1. The procedure of FIG. 18 is different from that of FIG. 16 in including a process of displaying an address list when the history information includes a single history record.

In the procedure of FIG. 18, the same processes as those of FIG. 16 are denoted with the same step numbers, and description thereof will be omitted as appropriate. The following description of the procedure of FIG. 18 will focus on processes different from those of FIG. 16.

The automatic selection process of FIG. 18 is executed when the user inputs to the terminal 2 an instruction "Scan the image with the latest settings and send the scanned image to Mr. A," for example. In this case, the settings of the most recent history record are reflected in the job settings, and then the address information is set.

In the automatic selection process illustrated in FIG. 18, if the history information of the logged-in user includes a plurality of history records (Yes at step S102), the plurality of history records are output to the screen similarly as in the automatic selection process of FIG. 16. If the history information of the logged-in user includes a single history record (No at step S102), on the other hand, the address list is output to the screen of the LCD of the operation device 16 (step S104-1). Herein, the address list is output to the operation device 16 based on address identifying information "Mr. A" included in the voice instruction. That is, the MFP 1 searches through the address information in the HDD 13 for an address information item in which "Mr. A" is registered as the address. If a plurality of address information items matching the search condition are retrieved, the plurality of retrieved address information items are displayed on the operation device 16 as the selection information. The MFP 1 then receives selection of an address selected by the user from the address list on the screen of the LCD of the operation device 16 through the touch input operation (step S104-2). If a single address information item is identified as a result of search through the address information, on the other hand, the single address information item is set as the address. In this case, the processes of steps S104-1 and S104-2 may be omitted.

In response to selection of the address by the user, the MFP 1 reflects the selected settings in the job settings (step S105).

That is, according to the procedure of FIG. 18, if the history information includes a single history record (No at step S102), it is possible for the user to reflect the previous settings of the job (e.g., scanning) and the settings of the address (e.g., the transmission destination of the scanned image) in the job settings with one selection operation.

If the history information includes a plurality of history records (Yes at step S102), the screen on the LCD of the operation device 16 of the MFP 1 displays the plurality of history records. Then, the user selects therefrom one history record, and thereby the previous settings of the job such as scanning are reflected in the job settings. Thereafter, the address such as the transmission destination of the scanned image is set. According to the above-described automatic selection process, when the history information includes a plurality of history records, the plurality of history records are displayed in a list. This automatic selection process may be modified as follows. If the history information includes a plurality of history records (Yes at step S102), the latest history record may be automatically (i.e., forcibly) selected therefrom, and the address list may be output to the screen of the LCD of the operation device 16 (step S104-1). The subsequent sequence including step S104-2 are similar to the above-described one.

In the present example, the history setting is given priority over the address setting. Alternatively, the address setting may be given priority over the history setting, depending on the settings. Further, in the above-described example, one of the history information list and the address information list is displayed. Alternatively, the display of the address information list and the reception of an address selected by the user may take place before or after the display of the history information list and the reception of a history record selected by the user.

An operation screen of the MFP 1 will be described.

FIG. 19 is a diagram illustrating an example of the operation screen of the MFP 1. FIG. 19 illustrates an example of a preview target selection list screen (i.e., history screen). If the user inputs a voice instruction "print with the last settings" to the terminal 2 and the cloud system 3 instructs the MFP 1 to execute the job, and if a plurality of history records are retrieved in the MFP 1, a history list is displayed on the operation screen of the panel of the operation device 16. FIG. 19 illustrates three history records included in the history list. On the selection list screen, the user selects one history record from the history list through the touch input operation. A hatched one of the three history records in FIG. 19 represents the history record selected by the user through the touch input operation. The settings of the selected history record (i.e., number of pages=1, print side=single-sided, color=full-color) are reflected in the job settings. The user is allowed to edit the settings with a "CHANGE SETTINGS" button on the screen. When the user presses a "PRINT" button on the screen, the print process is executed with the selected settings.

As understood from the foregoing description, in the voice operation system 100 of the embodiment, the terminal 2 is installed with the operation processing program as a platform application program, which communicates with the cloud system 3. When the user speaks to the microphone 29 of the terminal 2, the cloud system 3 analyzes the contents of the user utterance, and operates the MFP 1 to perform the operation specified by the user. That is, the voice input operation is performed.

Thereby, a command for a complicated operation is issued in voice, obviating the need for an operation with a graphical user interface (GUI) on the touch panel 27, for example. This configuration therefore makes the input operation faster and easier even for a user experienced with the operation. Further, the interactive operation support enables a senior or inexperienced user to perform a desired operation faster and with more ease when performing complicated network setting or advanced job setting or when installing a new application program, for example.

Further, since the intention of the user is interpreted based on the text of the user utterance, the process based on the user utterance is determined by the cloud system 3.

Further, the MFP 1 stores the settings previously used by the user as the history information, and thus is capable of easily reading the settings previously used by the user.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more circuits or circuitry. Circuitry includes a programmed processor, as a processor includes circuitry. A circuitry also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An information processing apparatus, comprising:
a memory to store history information including setting information of a previously executed process; and
circuitry configured to
receive, via a server, a user request input in voice to a terminal, the user request including condition information and job information,
in response to receipt of an instruction from the server to reflect previous settings in job settings, reflect settings of a particular history record, out of the history information stored in the memory, in the job settings, based on the condition information and the job information included in the user request, and
execute a process based on the user request with the job settings reflecting the settings of the particular history record.

2. The information processing apparatus of claim 1, wherein the circuitry is further configured to automatically reflect settings of a most recently used history record, of the history information, as the particular history record in the job settings, based on the user request.

3. The information processing apparatus of claim 1, wherein the circuitry is further configured to identify settings of at least one history record of the history information, based on frequency of use of history records.

4. The information processing apparatus of claim 1, wherein the circuitry is further configured to
when the history information includes a single history record corresponding to the selected settings, reflect settings of the single history record in the job settings based on the user request.

5. The information processing apparatus of claim 1, wherein the memory further stores address information, and
wherein in response to receipt of an instruction from the server to reflect settings of an address in the job settings, the circuitry is further configured to identify at least one address information item in the address information in the memory, based on address identifying information included in the instruction.

6. The information processing apparatus of claim 5, wherein
when the history information includes a single history record corresponding to settings selected based on the user request, the circuitry is further configured to reflect settings of the single history record in the job settings based on the user request, and then output an address information list as selection information.

7. The information processing apparatus of claim 6, wherein when the history information includes the plurality of history records corresponding to the settings selected based on the user request, the circuitry is further configured to reflect settings of a most recent history record of the plurality of history records in the job settings based on the user request, and then output the address information list as the selection information.

8. The information processing apparatus of claim 5, wherein the circuitry is further configured to use condition information to further select one or more history records from out of the plurality of history records included in the history information.

9. The information processing apparatus of claim 8, wherein the circuitry is further configured to select the one or more history records with settings executed within a certain time before an execution time of settings of a most recent history record of the plurality of history records.

10. The information processing apparatus of claim 1, wherein the memory further stores the settings of the particular history record in association with login information used by a user when the user logs in to the information processing apparatus.

11. The information processing apparatus of claim 1, wherein when the history information includes a plurality of history records, the circuitry is further configured to filter the plurality of history records to select, for a list of history records to be output, only those history records that correspond to an executed process executed within a predetermined time period.

12. The information processing apparatus of claim 1, wherein when the history information includes a plurality of history records, the circuitry is further configured to filter the plurality of history records, based on at least one of a time of execution or a type of executed process of each history record, to determine and output a list of history records, and receive selection of the particular history record from the list.

13. The information processing apparatus of claim 1, wherein the circuitry is configured to receive the user request, which includes the condition information, which indicates that a most recently used history record should be used as the particular history record.

14. An information processing system, comprising:
a server; and
an information processing apparatus connectable with the server via a communication network,
the server including first circuitry configured to
acquire audio information of voice input via a terminal, and
based on the acquired audio information, instruct the information processing apparatus to execute settings based on a user request, the user request including condition information and job information, and
the information processing apparatus including
a memory to store history information including setting information of a previously executed process, and
second circuitry configured to
when the user request includes information specifying previous settings, reflect settings of a particular history record, out of the history information stored in the memory, in job settings, based on the condition information and the job information included in the user request, and
execute a process based on the user request with the job settings reflecting the settings of the particular history record.

15. The information processing system of claim 14, wherein the first circuitry of the server is further configured to:
convert the acquired audio information into text information,
interpret the user request based on the text information,
transmit the user request to the information processing apparatus, and
transmit audio information to the terminal in response to the user request.

16. The information processing system of claim 14, wherein the information processing apparatus further includes an operation device configured to output setting information.

17. An information processing method, comprising:
storing, in a memory, history information including setting information of a previously executed process;
acquiring a user request input in voice to a terminal, the user request including condition information and job information;
when the user request includes an instruction to reflect previous settings in job settings, reflecting settings of a particular history record, out of the history information stored in the memory, in the job settings, based on the condition information and the job information included in the user request; and
executing a process based on the user request with the job settings reflecting the settings of the particular history record.

18. The information processing method of claim 17, further comprising:
acquiring audio information of voice input via the terminal; and
interpreting the user request based on the acquired audio information.

* * * * *